United States Patent
Nose et al.

(10) Patent No.: US 8,130,407 B2
(45) Date of Patent: Mar. 6, 2012

(54) EDITING PROGRAM STORED IN COMPUTER-READABLE STORAGE MEDIUM

(75) Inventors: Tetsuya Nose, Nagoya (JP); Motonori Tanaka, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1496 days.

(21) Appl. No.: 11/436,302

(22) Filed: May 18, 2006

(65) Prior Publication Data

US 2006/0262328 A1    Nov. 23, 2006

(30) Foreign Application Priority Data

May 20, 2005   (JP) ................... 2005-148178

(51) Int. Cl.
*G06K 15/00* (2006.01)
(52) U.S. Cl. .................. 358/1.18; 235/462.09
(58) Field of Classification Search .................. 358/1.15, 358/1.18, 1.9; 235/462.01, 462.02, 462.09; 345/690, 695, 698
See application file for complete search history.

(56) References Cited

U.S. PATENT DOCUMENTS

| | | | |
|---|---|---|---|
| 6,533,181 B1 * | 3/2003 | Roxby et al. | 235/494 |
| 6,681,055 B1 * | 1/2004 | Sato | 382/275 |
| 6,724,921 B2 * | 4/2004 | Yamaguchi | 382/118 |
| 6,983,886 B2 * | 1/2006 | Natsukari et al. | 235/462.1 |
| 2004/0046024 A1 | 3/2004 | Natsukari et al. | |

FOREIGN PATENT DOCUMENTS

| | | |
|---|---|---|
| EP | 1480160 A2 | 11/2004 |
| JP | 2000-076372 | 3/2000 |
| JP | 2003 203196 | 7/2003 |

OTHER PUBLICATIONS

Hiroshi Azumaguchi, "Binary Code Automatic Generating System QRIP," Monthly BarCode vol. 14, Issue 13, Japan, Japan Industrial Publishing Co., Ltd., Nov. 2001, vol. 4, 10-12.

* cited by examiner

*Primary Examiner* — David K Moore
*Assistant Examiner* — Vu Hang
(74) *Attorney, Agent, or Firm* — Day Pitney LLP

(57) ABSTRACT

When changing a size of a QR code, rather increasing or decreasing a size of cells to thereby scaling up or down an entirety of the QR code respectively, than a size of the entirely of the QR code is increased or decreased by upgrading or downgrading a version of the QR code respectively.

21 Claims, 20 Drawing Sheets

… (1)

EDITING PROGRAM STORED IN COMPUTER-READABLE STORAGE MEDIUM

This application claims priority from Japanese patent application serial number 2005-148178, filed May 20, 2005, the contents of which are hereby incorporated by reference.

BACKGROUND OF THE INVENTION

1. Field of the Invention

The disclosure relates to a print data editing apparatus, a print data editing program, and a recording medium for storing the print data editing program and, more specifically, to a print data editing apparatus for editing print data for printing of a QR code ("quick response" code, as associated with matrix codes or two-dimensional bar codes) and a print data editing program stored in a computer-readable storage medium.

2. Description of the Prior Art

Conventionally, a barcode for printing information such as characters and numeric characters as a graphic pattern and a two-dimensional code capable of recording further information are known. A barcode or a two-dimensional code is respectively read by a dedicated machine or photographed by a camera of a cellular phone to be read and then processed, to read information recorded in it. A two-dimensional code and a barcode can record more information and in a smaller area than the case of representing information by using a character or a numeric character and, therefore, are used for wide range of applications such as service information for a distributor, a manufacturer, an individual, etc., including description of product information for product management, display of detailed information too much to appear in the space of a pamphlet or a poster, and display of a URL at a cellular phone site in an Internet homepage.

As one of such barcodes and two-dimensional codes, a QR code may be enumerated. A single QR code is an approximately square-shaped two-dimensional one into which the same number of approximately square-shaped regions each of which is referred to as "cell" are collected vertically and horizontally. The more cells are collected, the more data can be recorded in one QR code. For example, QR codes of model 2 are assigned version numbers of "1" through "40" and prescribed to each include an increasing number of cells with an increasing version number. Specifically, if a version number is represented by N, the number of cells of each of sides of a QR code is given by "N×4+17". Therefore, to record more information, it is necessary to use a QR of a higher numbered version, thus resulting in a larger print area. Conversely, less information can be represented by a QR code of a lower numbered version, thus resulting in a smaller print area required. Accordingly, as for an unit or software for editing print data required to print a conventional QR code created, a version number has been determined by a size of data to be recorded or by a user manually.

To change a size (print area) of a QR code, a cell size has been increased or decreased to change the size of the QR code as a whole (see Japanese Patent Application Laid Open Publication No. 2003-203196, for example).

However, in a case where a size of a QR code as a whole is changed by changing a size of a cell as in the case of a barcode creation apparatus of an invention disclosed in Japanese Patent Application Laid Open Publication No. 2003-203196, each time the cell size is increased by one dot, the size of the QR code increases by dots as many as the number of cells that constitute each side of the QR code, so that such a problem occurs that the QR code size is changed stepwise.

For example, a QR code of version 5 has 37 cells for each of its sides, so that if each side of each of these cells is displayed using one dot, each side of the QR code has 37×1 dot=37 dots. If the number of dots for each cell side is increased to two, each side of the QR code has 37×2 dots=74 dots, if the number of dots for each cell side is increased to three, each side of the QR code has 111 dots, and if the number of dots for each cell side is increased to four, each side of the QR code has 148, thus resulting in a stepwise change in size. Further, a QR code of version 4 has 177 cells for each of its side, so that if the number of dots for each cell side is one, each side of the QR code has 177 dots, if the number of dots for each cell side is increased to two, each side of the QR code has 354 dots, if the number of dots for each cell side is increased to three, each side of the QR code has 531 dots, and if the number of dots for each cell side is increased to four, each side of the QR code has 708 dots. In such a manner, as an increasing version number and an increasing number of cells per each side, a difference in stepwise change of the size of the QR code owing to a change in size of each side of each of the cells increased.

Further, especially, a printer having a lower resolution has a larger size of each dot and so has a problem that a difference in stepwise change of a size of a QR code print area increases further.

OBJECTS AND SUMMARY OF THE INVENTION

In view of the above, the disclosure has been developed, and it is an object of the disclosure to provide a print data editing apparatus that can adjust a size of a QR code in a finer step and a print data editing program stored in a computer-readable storage medium.

A print data editing apparatus according to a first aspect comprises, especially for the purpose of editing print data required in printing in a printer a display that displays a QR code, which is one type of a two-dimensional code which is represented by an approximately square shape in which a plurality of squared cells, each of which is a structure-wise basic unit, is arranged vertically and horizontally, a size specification device that specifies a size of the QR code being displayed on the display, version determination device that determines a version that specifies the number of the cells that constitute the two-dimensional code, based on the size specified by the size specification device, and a QR code re-creation device that re-creates the QR code whose size has been specified by the size specification device into a QR code of the version determined by the version determination device, without changing a size of the cells.

A print data editing apparatus according to a second aspect comprises, especially for the purpose of editing print data required in printing in a printer a display that displays a QR code, which is one type of a two-dimensional code which is represented by an approximately square shape in which a plurality of squared cells, each of which is a structure-wise basic unit, is arranged vertically and horizontally, a size specification device that specifies a size of the QR code being displayed on the display, a controller that determines a version that specifies the number of the cells that constitute the two-dimensional code, based on the size specified by the size specification device, and re-creates the QR code whose size has been specified by the size specification device into a QR code of the version determined by the version determination device, without changing a size of the cells.

A print data editing program according to a third aspect that is stored in a computer-readable storage medium comprises a display step that displays on a display a QR code, which is one type of a two-dimensional code which is represented by an approximately square shape in which a plurality of squared cells, each of which is a structure-wise basic unit, is arranged vertically and horizontally, a size specification step that specifies a size of the QR code being displayed at the display step, a version determination step that determines a version that specifies the number of the cells that constitute the two-dimensional code, based on the size specified at the size specification step, and a QR code re-creation step that re-creates the QR code whose size has been specified at the size specification step into a QR code of the version number determined at the version determination step, without changing a size of the cells.

BRIEF DESCRIPTION OF THE DRAWINGS

Exemplary embodiments of the disclosure will be described below in detail with reference to the accompanying drawings in which.

DESCRIPTION OF THE PREFERRED EMBODIMENTS

The following will describe embodiments of the disclosure with reference to drawings. They are described by exemplifying a personal computer 2 connected to a printer 1, as a "print data editing apparatus" related to the disclosure. Into this personal computer 2, a "print data editing program" related to the disclosure is installed. First, the printer 1 and the personal computer 2 are described with reference to FIGS. 1 and 2.

Figure 1:
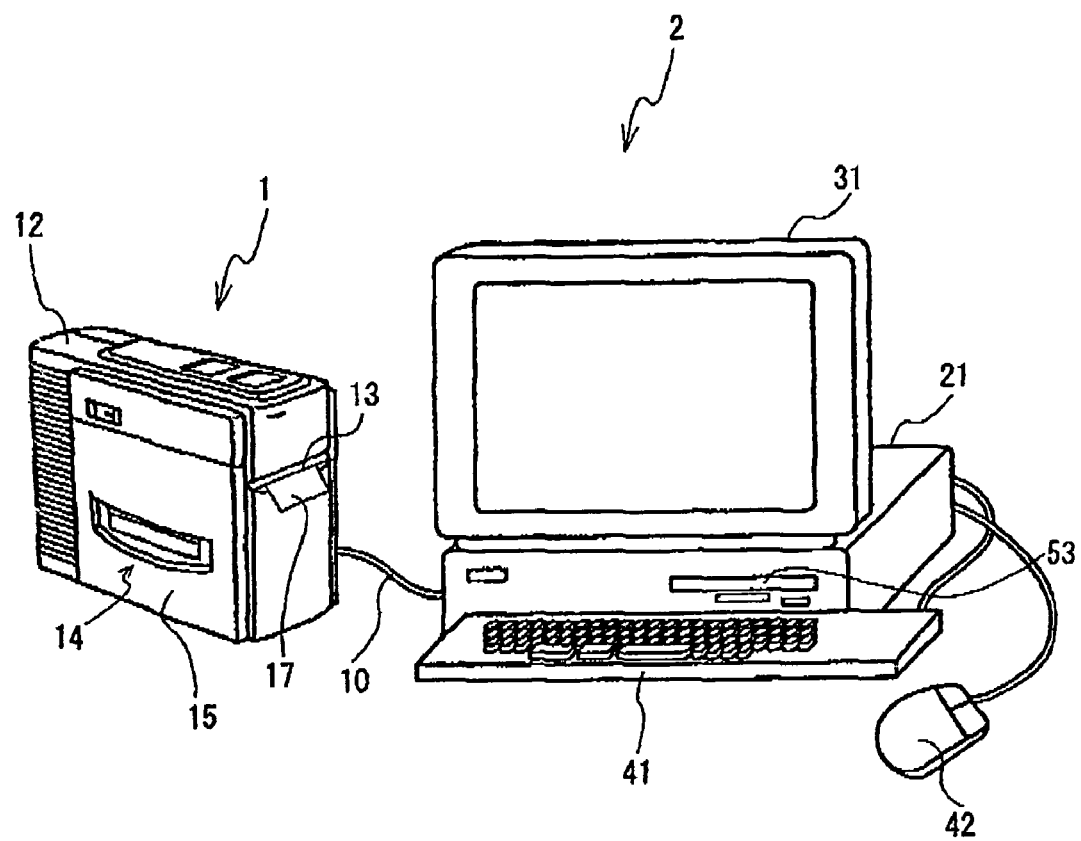
FIG. 1 is an external perspective view outlining a printer and a personal computer.

As shown in FIG. 1, the personal computer 2 and the printer 1 are connected to each other with a USB cable 10 in accordance with, for example, USB standards, so that data is transferred between them via the USB cable 10. The personal computer 2 is a known one and, as shown in FIG. 1, comprises a body 21 equipped with a CPU 50 (see FIG. 2), a monitor 31, a keyboard 41, and a mouse 42 in such a configuration that the monitor 31, the keyboard 41, and the mouse 42 are each connected to the body 21 by using a connection cable. In this configuration, the personal computer 2 creates print data based on image data produced by the software into which the print data editing program related to the disclosure has been installed and then transmits the created print data to the printer.

Further, as shown in FIG. 1, the printer 1 is housed in an approximately rectangle-shaped frame 12 and has, on its front side (right front side in FIG. 1), an outlet 13 for ejecting a tape 17. Into a left side of the frame 12, a tape cassette housing 14 is provided so that a tape cassette can be attached to and detached from the frame 12 by opening a cover 15 provided on the left side of the frame 12. This tape cassette housing 14 is equipped with a printing mechanism for printing information on the tape 17 of a mounted tape cassette by causing the tape 17 to travel between a thermal head having a plurality of heater elements and a platen roller abutted against this thermal head, so that the tape 17 may have the information printed on it by the printing mechanism and cut off by a tape cutter of the printing mechanism and ejected from the outlet 13.

Figure 2:
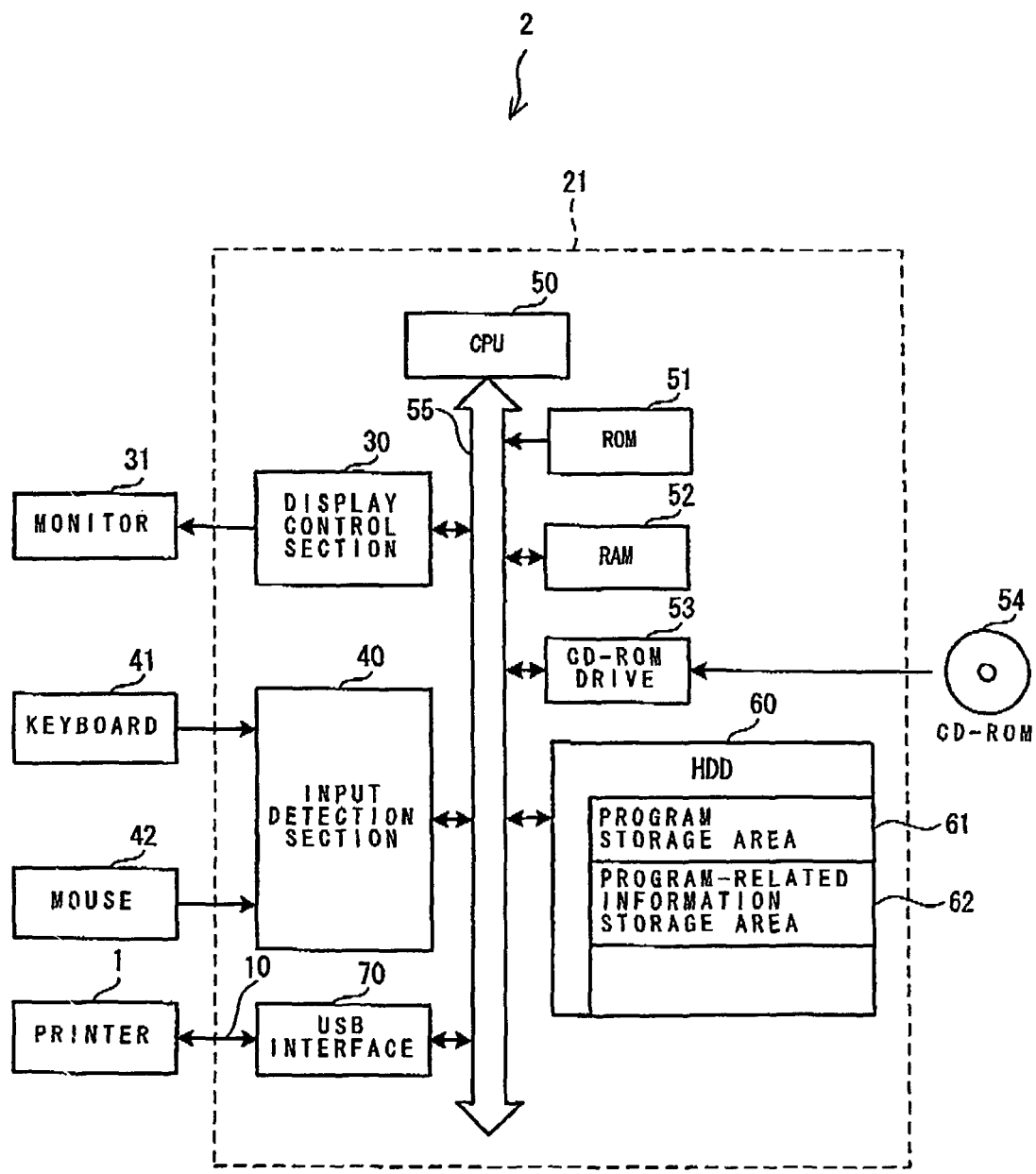
FIG. 2 is a block diagram showing an electrical configuration of the personal computer.

The following will describe an electrical configuration of the personal computer 2 with reference to FIG. 2. As shown in FIG. 2, the personal computer 2 is equipped with the CPU 50 that conducts control on the personal computer 2. To this CPU 50 are connected via a bus 55 an ROM 51 in which programs such as an BIOS executed by the CPU 50 are stored, an RAM 52 which stores data temporarily, a CD-ROM drive 53 which reads data when a CD-ROM 54, which is a data storage medium, is inserted into it, and an HDD 60, which is a data storage.

The HDD 60 is provided with a program storage area 61 which stores the print data editing program and other various programs to be executed by the personal computer 2, a program-related information storage area 62 which stores information including settings and initial values required to execute the programs and data, etc.

To the CPU 50 are further connected via the bus 55 a USB interface 70 required to communicate with an external unit including the printer 1, a display control section 30 which performs screen display processing for the monitor 31 for displaying an operation screen to a user, and an input detection section 40 which detects an input of a user's operation through the keyboard 41 and the mouse 42 when connected to them. It is to be noted that the personal computer 2 may be equipped with a flexible disk drive, an input/output section for audio etc., a variety of interfaces, etc., although they are not shown.

It is to be noted that the in the CD-ROM 54, the software into which the print data editing program is incorporated and settings, data, etc. used to execute this program are stored, so that upon introduction, this information is automatically stored from the CD-ROM 54 into the program storage area 61 and the program-related information storage area 62 provided in the HDD 60. It is to be noted that a medium for acquiring the print data editing program and data etc. to be used by it for an operation of the personal computer 2 is not limited to the CD-ROM 54 but may be any other recording medium such as a flexible disk or an MO (Magneto-Optical Disk) or these information pieces may also be acquired from any terminal in a network other than the personal computer 2 by connecting the personal computer 2 to this network.

Figure 3:
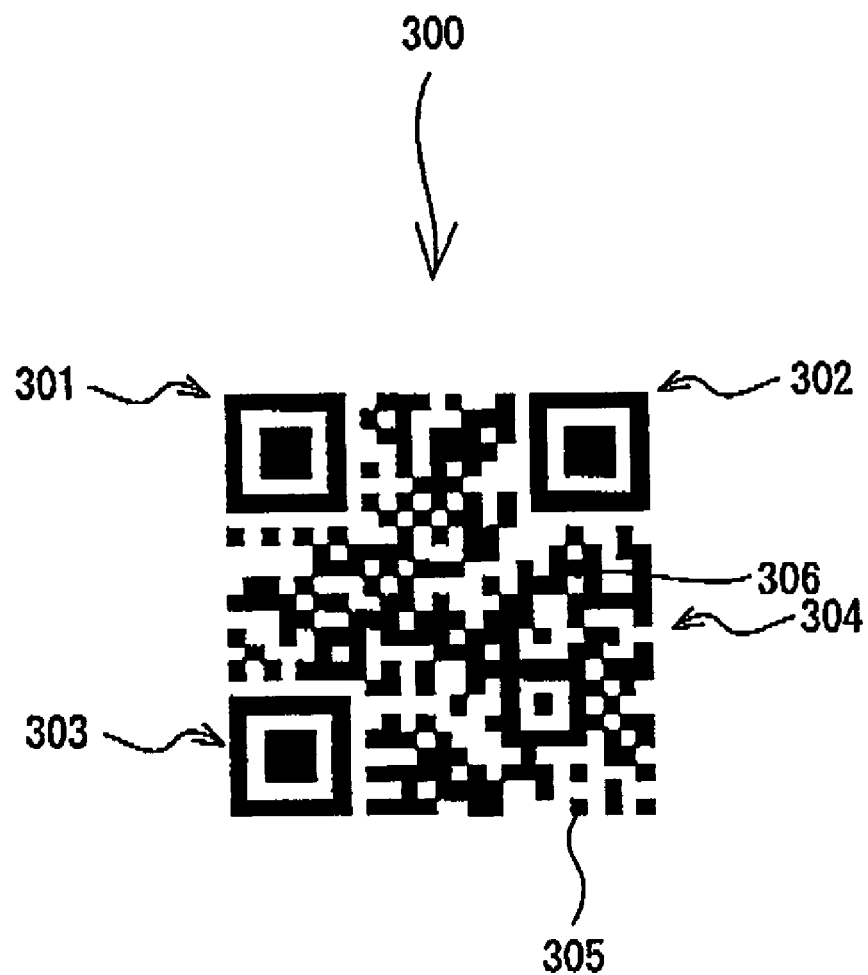
FIG. 3 is an illustration of a QR code, which is one example of QR codes.
Figure 4:
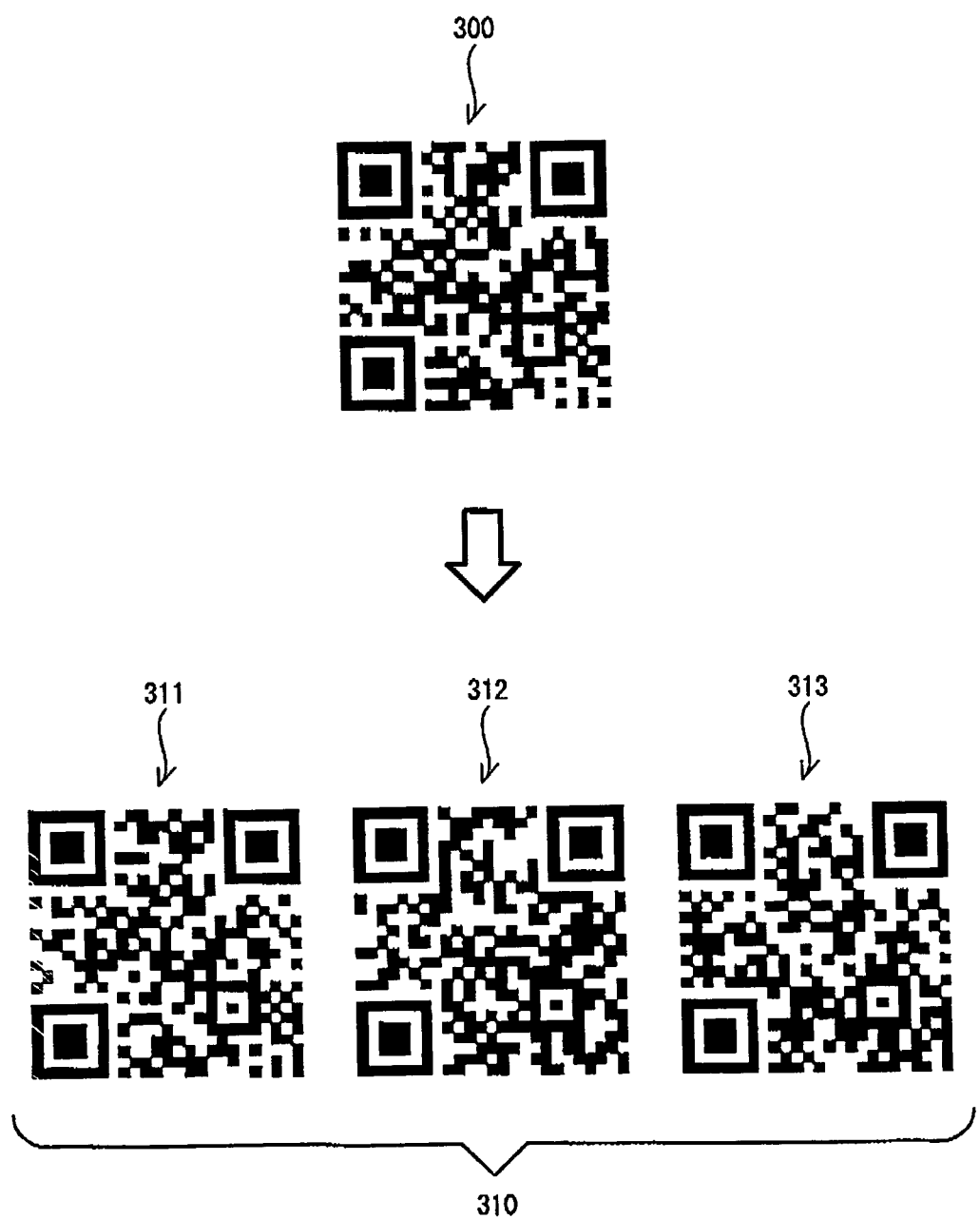
FIG. 4 is an illustration of a concatenation QR code represented by dividing the QR code.

The following will describe a QR code with reference to FIGS. 3 and 4. As shown in FIG. 3, a QR code 300 is a matrix-type symbol system that is constituted of an approximately squared shape in which the same number of approximately squared regions (hereinafter referred to as cells) 305 are arranged vertically and horizontally, in which information is patterned in accordance with whether these cells are filled.

The QR codes come in three models depending on standards thereof. These models are "micromodel", "model 1", and "model 2". As shown in FIG. 3, the QR code 300 is of "model 2". A model-2 QR code has a position detection pattern 301 at its left top corner, a position detection pattern 302 at its right top corner, and a position detection pattern 303 at its left bottom corner. A device (decoder) that reads a QR code can detect these position detection patterns 301 to 303 from an image region, to thereby detect a region and an orientation of a QR code. Further, in contrast to a QR code of "model 2", a QR code of "model 1" does not have an alignment pattern 306 in it and also has the other specifications slightly different from those of the "model 2" QR code; however, both of them use the position detection patterns 301, 302, and 303. It is to be noted that "micromodel" is suited for storing an extremely small amount of data (which is tantamount to a 35-digit numeric character), a QR code of which model has a small number of cells and uses only the position detection pattern 301 but does not use the position detection patterns 302 and 303.

Furthermore, a QR code has an error correction function and, therefore, is capable of reading data even if it is partially tainted or damaged, by which its restoration level can be specified in accordance with an error correction level. Further, an amount of data that can be recorded in a QR code is determined by the number of cells of the QR code. The number of cells is specified by a specified version. The "model 2" QR codes have version numbers of 1 to 40 in such a manner that the more the version number increases, the more data can be recorded, for example, each side of the QR code in version 1 has 21, 25, (4N+17), and 177 cells for versions 1, 2, N, and 40 respectively. The QR code version, recorded data, data for error correction, etc. are stored in a region 304 other than the position detection patterns 301 to 303. Further, the alignment pattern 306 is appropriately arranged in the region 304, to provide a reference in case of a possible deflection in reading of the QR code 300. It is to be noted that the "micromodel" QR codes have only four versions 1 to 4 stepwise and the "model 1" QR codes have only 14 versions of 1 to 14.

It is to be noted that the QR code 300 shown in FIG. 3 is of model 2 and version 2, in which data of "1234567890" is recorded at an error correction level of 15%.

Further, a QR code can be divided into two through 16 QR codes. FIG. 4 shows a concatenation QR code 310 obtained by dividing a QR code 300 shown in FIG. 3 into three codes of divided QR codes 311, 312, and 313.

The following will describe screens which are displayed by an editor 100 which is activated in the personal computer 2 and operations by use of the editor 100, with reference to FIGS. 5 to 8.

These screens 100, 210, 220, and 230 are displayed on the monitor 31 of the personal computer 2, on which screens, data and commands are input by operating the keyboard 41 or the mouse 42. Further, settings already input on these barcode property screen 210, 220, and 230 are saved in the HDD 60 together with information of the other print data as their property information for each of objects.

Figure 5:
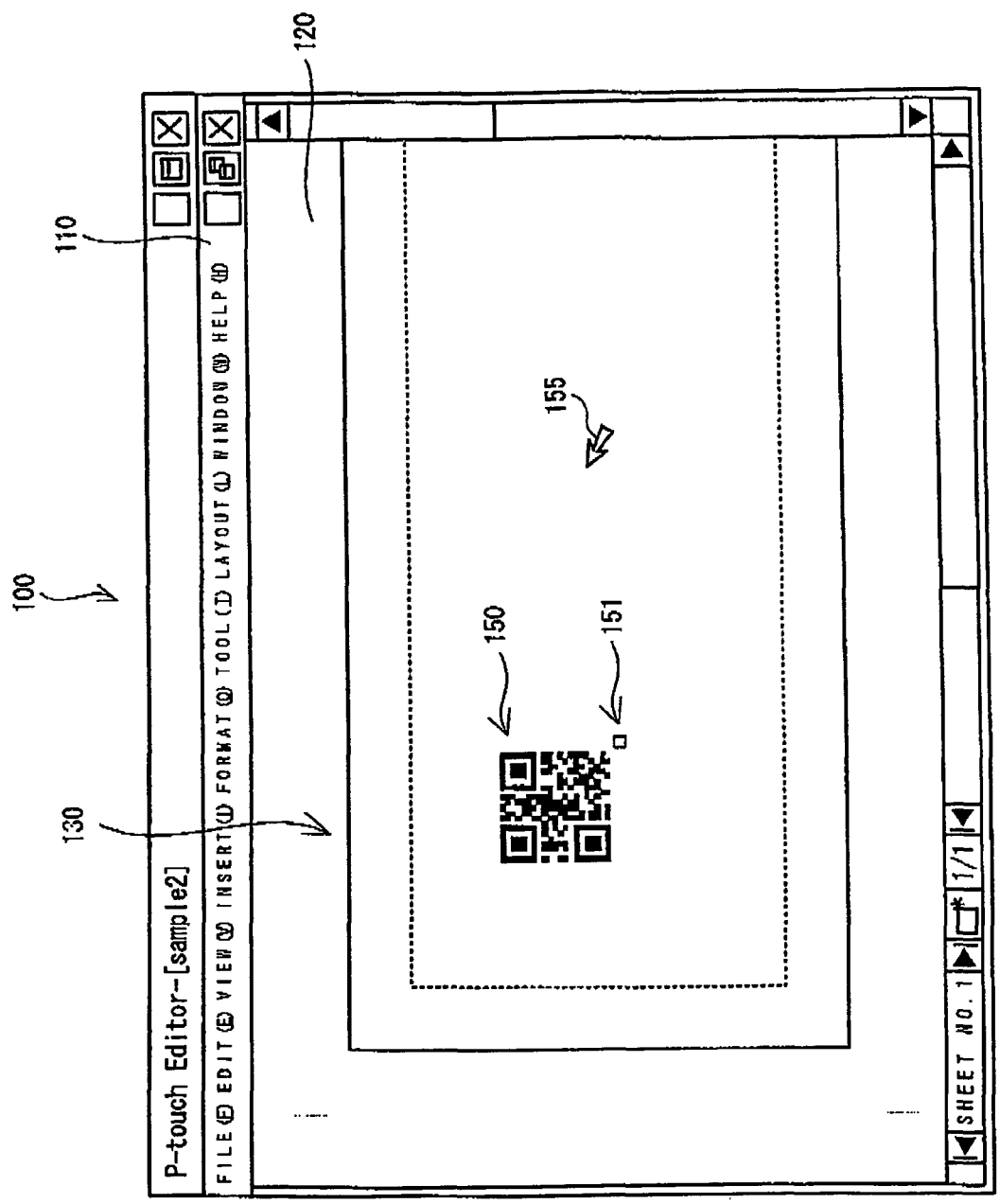
FIG. 5 is an image of an editor that inputs a character, a QR code, etc. to be printed by the printer.

As shown in FIG. 5, the editor 100 is provided, at its upper portion, with a menu bar 110 for commanding operations and, at its lower half, with a work area 120 for editing characters etc. to be printed by the printer 1, in which a print image 130 is displayed currently. Further, an arrow in the work area 120 indicates a cursor 155. By operating such an editor 100 with the keyboard 41 or the mouse 42, information to be printed by the printer 1 can be edited. In the work area 120 of the editor 100 shown in FIG. 5, a print image of a QR code (QR code object) 150 is displayed currently. Below and to the right of the QR code object 150, a handle 151 for changing a size is provided. By placing the mouse cursor 155 onto this handle 151 and dragging it, a size of the QR code object 150 can be changed. It is to be noted that the handle 151 is controlled so that it can be moved on a diagonal line from the left top to the right bottom of the QR code object 150.

Figure 6:
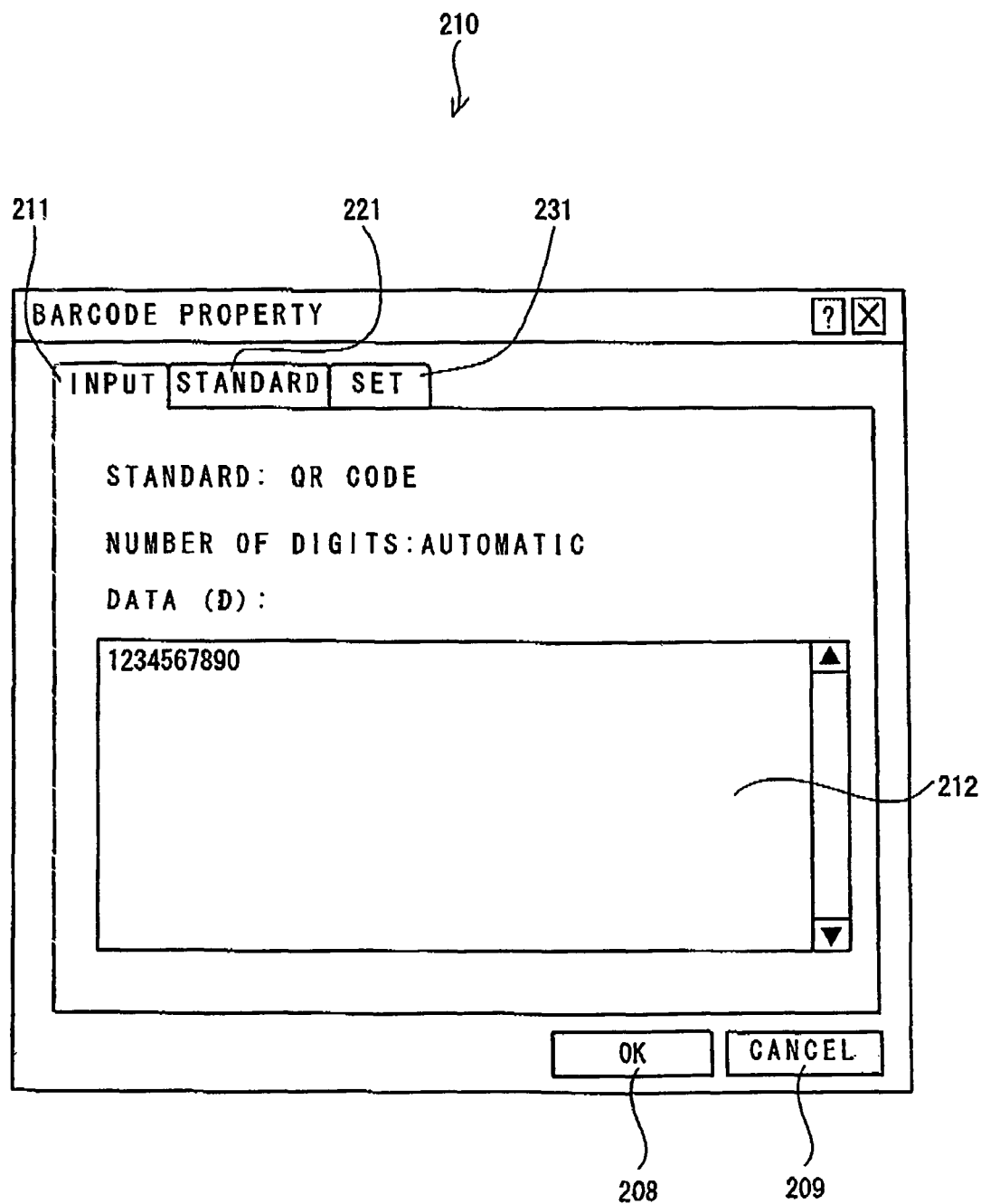
FIG. 6 is an image of a case where an "INPUT" tab is selected on a barcode property screen displayed when a QR code is inserted into a work area of the editor.
Figure 7:
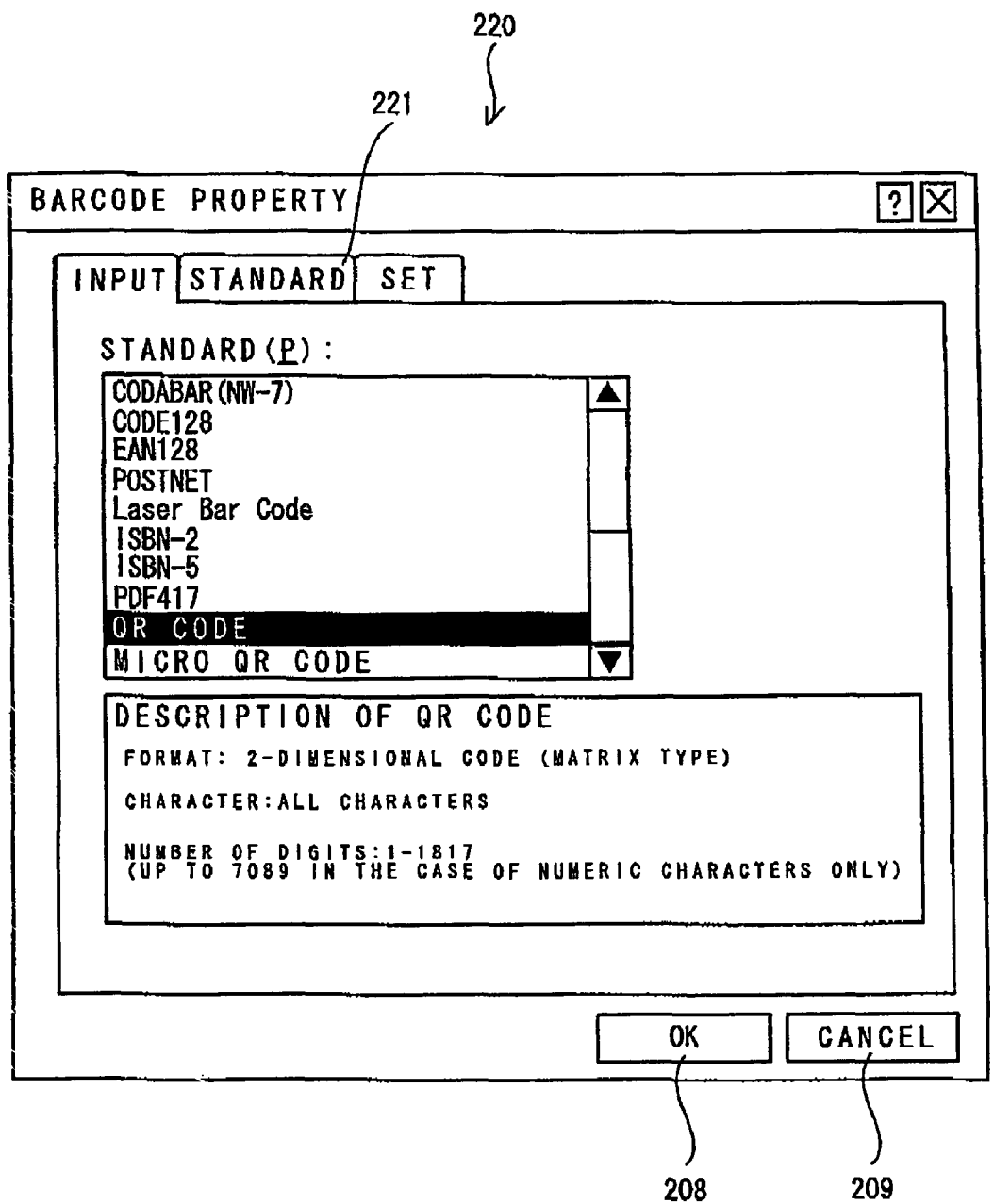
FIG. 7 is an image of a case where a "STANDARD" tab is selected on a barcode property screen.

If "INSERT" is selected in the menu bar 110 of the editor 100 and "BARCODE" is selected in a combo box, the barcode property screen 210 shown in FIG. 6 appears. As shown in FIG. 6, the barcode property screen is provided with an "INPUT" tab 211, a "STANDARD" tab 221, and a "SET" tab 231. The "INPUT" tab 211 has an input area 212 for inputting data to be stored in a QR code so that data input into this area may be stored in the QR code. Further, as shown in FIG. 7, in a case where the "STANDARD" tab 221 is selected as shown in FIG. 7, it is possible to select standards of barcodes and two-dimensional codes to be inserted, such as "CODABAR (NW-7)", "CODE128", and "QR code".

Figure 8:
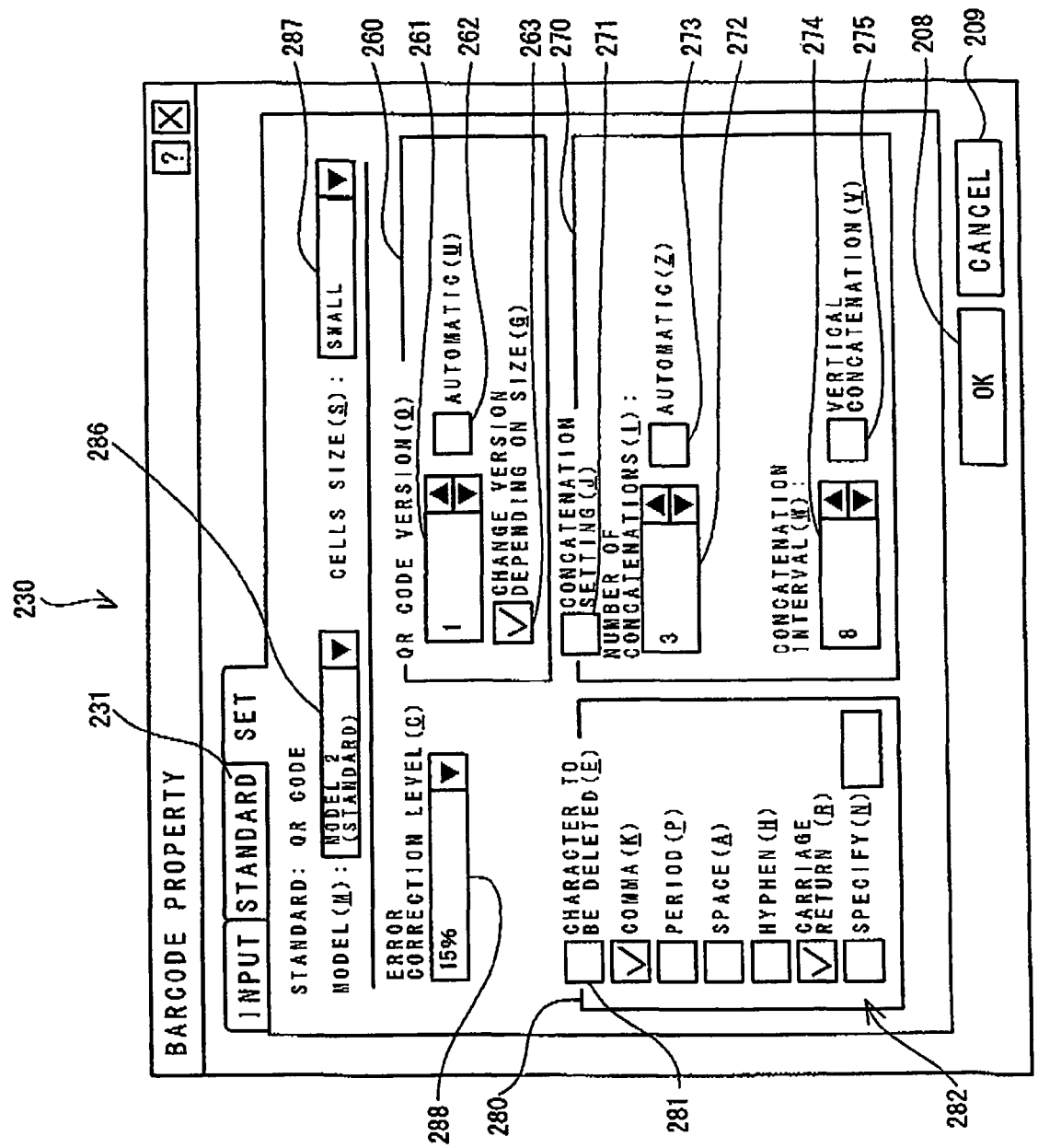
FIG. 8 is an image of a case where a "SET" tab is selected on a barcode property screen.

Further, in a case where the "SET" tab 231 is selected as shown in FIG. 8, it is possible to make a variety of settings of the QR code object 150. As shown in FIG. 8, on the barcode property screen 230 on which the "SET" tab 231 is selected, "QR code" is displayed as a standard on the first line, and on the second line, a model selection combo box 286 and a cell size selection combo box 287 are provided. Below it is provided an error correction level selection combo box 288, to the right of which is provided a QR version field 260. Below the error correction level selection combo box 288 are provided a character-to-be-deleted field 280, and below the QR code version field 260 is provided a concatenation setting field 270.

In the model selection combo box 286, a QR code model can be selected from "MICROMODEL", "MODEL 1", and "MODEL 2". In the cell size selection combo box 287, a size of each cell can be selected from "SMALL", "MEDIUM SMALL", "MEDIUM", "MEDIUM LARGE", and "LARGE". With the increasing size from "SMALL" through "LARGE", the number of dots that constitute a cell increases. Further, in the error correction level selection combo box 288, an error correction level can be selected from "7%", "15%", "125%", and "30%". In the QR code version field 260 are provided a version specification list box 261, an automatic setting check box 262, and an update check box 263. In the character-to-be-deleted field 280 is provided a character-to-be-deleted check box 281; and such control is provided that when this character check box 281 is checked, a character specification check box group 282 can be operated. In an example shown in FIG. 8, characters specified in "comma", "period", "space", "hyphen" "carriage return", and "specify" fields are each provided with a check box.

In the version specification list box 261, a version number can be selected from "1" to "40", to display a version number of the current QR code object 150. If the automatic setting check box 262 is checked already, a lowest version number is selected which enables storing of data which has been input into the input area 212 on the barcode property screen 210 on which the "INPUT" tab 211 is selected. If the automatic setting check box 262 is checked already, such control is provided that the version specification list box 261 may not be selected. In the update check box 263, it is possible to specify whether to perform processing that changes a version of the QR code object 150 in a case where a size of the QR code object is changed by scaling up or down the handle 151 (see FIG. 5) of the QR code object 150 being displayed in the work area 120 by operating the mouse 42. This processing is an important portion of the disclosure and will be detailed later with reference to flowcharts of FIGS. 14 to 17.

In the concatenation setting field 270, setting can be performed when dividing a QR code and displaying concatenation QR codes. By checking the concatenation setting check box 271, it is possible to operate a number-of-concatenations list box 272, an automatic check box 273, a concatenation-interval list box 274, and a vertical concatenation check box 275.

The following will describe scaling up/down of a QR code object with reference to FIGS. 9 to 13.

Figure 9:
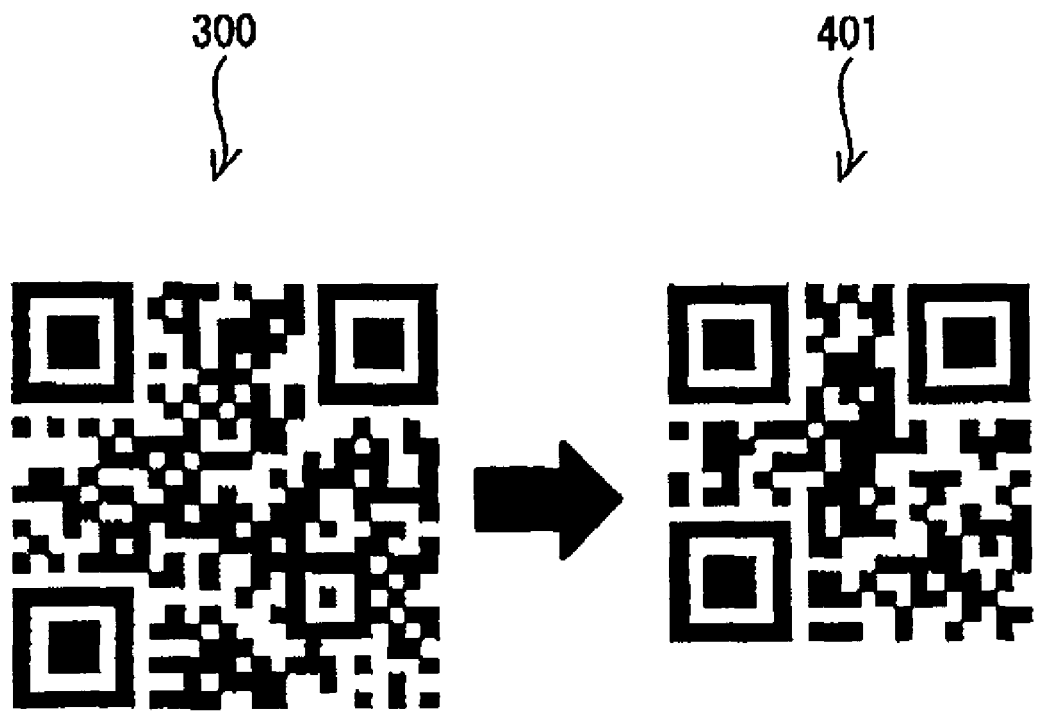
FIG. 9 is an illustration of a QR code obtained by scaling down the QR code shown in FIG. 3.

According to a print data creation unit and a print data creation program of the disclosure, if a size of a QR code object is decreased, a version of the QR code 300 is downgraded to decrease the size as shown in FIG. 9 instead of scaling down cells of the QR code 300 to thereby scale down an entirety. A single QR code 401 shown in FIG. 9 is a QR code of version 1 of model 2.

Figure 10:
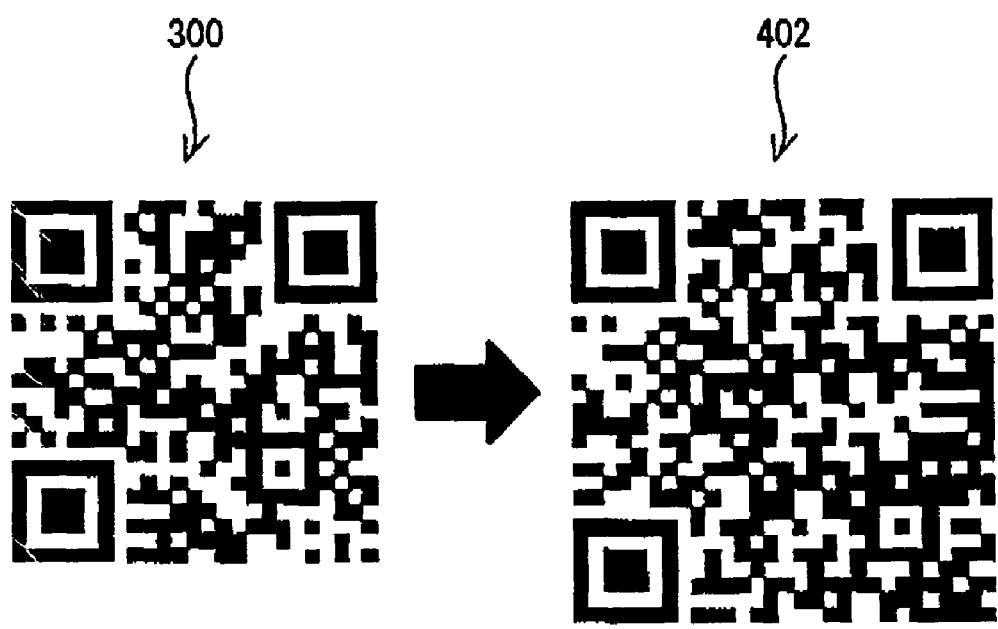
FIG. 10 is an illustration of a QR code obtained by scaling up the QR code shown in FIG. 3.
Figure 11:
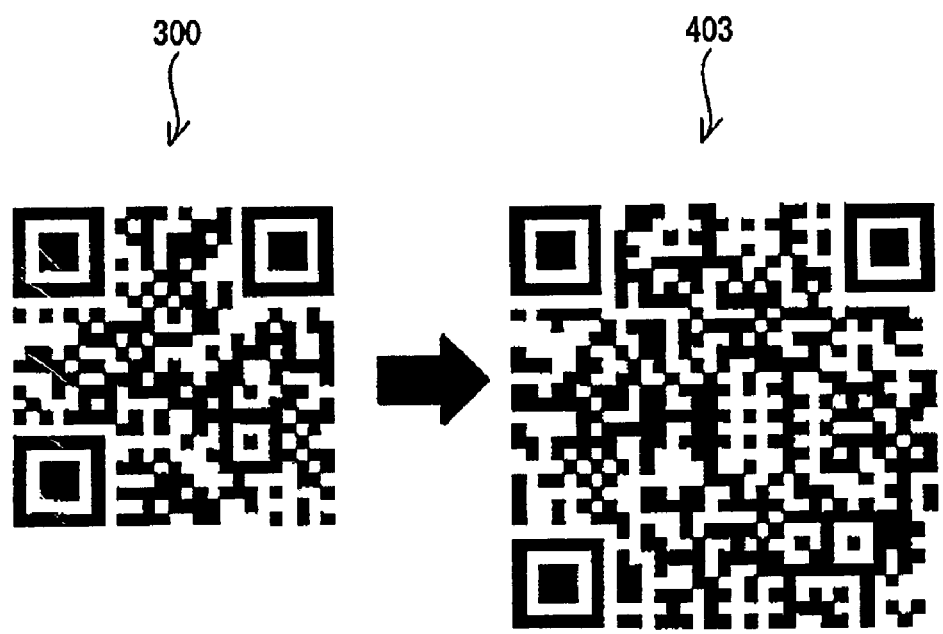
FIG. 11 is an illustration of another QR code obtained by scaling up the QR code shown in FIG. 3.
Figure 12:
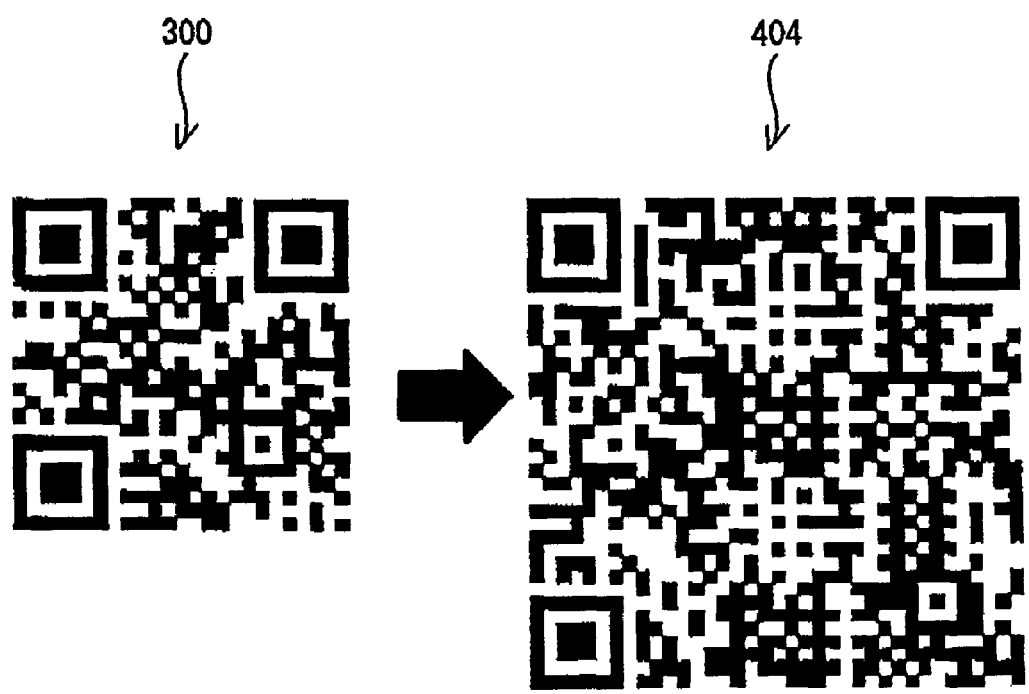
FIG. 12 is an illustration of a further QR code obtained by scaling up the QR code shown in FIG. 3.
Figure 13:
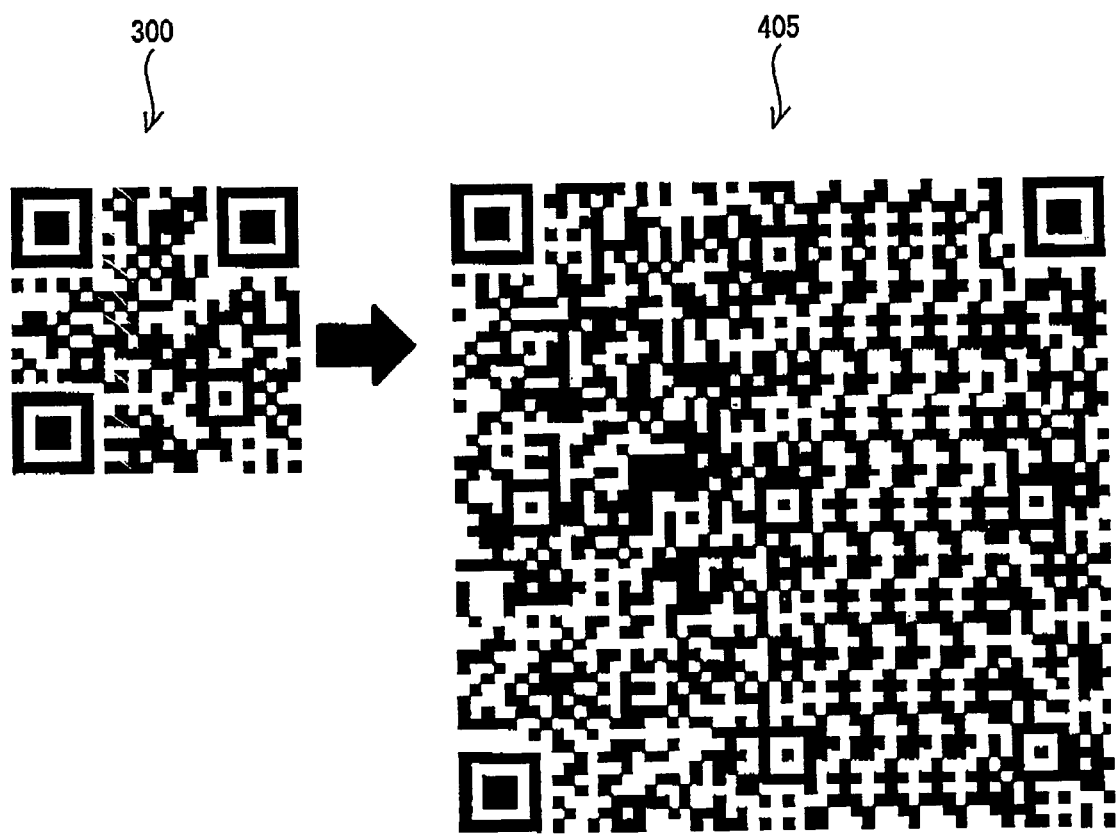
FIG. 13 is an illustration of a still further QR code obtained by scaling up the QR code shown in FIG. 3.

Conversely, if the size of a QR code object is increased, the version of the QR code 300 is upgraded to thereby increase the size of the QR code object as shown in FIGS. 10 to 13 instead of scaling up the cells of the QR code 300. A single QR code 402 shown in FIG. 10 is a QR code of version 3 of model 2, a QR code 403 shown in FIG. 11 is a QR code of version 4 of model 2, a QR code 404 shown in FIG. 12 is a QR code of version 5 of model 2, and a QR code 405 shown in FIG. 13 is a QR code of version 10 of model 2.

The following will describe processing to change a size of a QR code object by changing aversion, with reference to FIGS. 14 to 17.

In the present example, by dragging the handle 151 of the QR code object 150 through operation of the mouse 42, it is possible to command to increase or decrease a size of the QR code object 150. A post-size alteration version of the QR code object 150 takes on such a determined highest version number (version with largest size) that the size of the QR code may not be larger than a square that is determined by coordinates of left top of the QR code object 150 and coordinates of the mouse pointer 155 at a point in time when dragging of the mouse 42 is completed, so that the QR code object 150 of the thus determined version is created without changing a size of cells.

Figure 14:
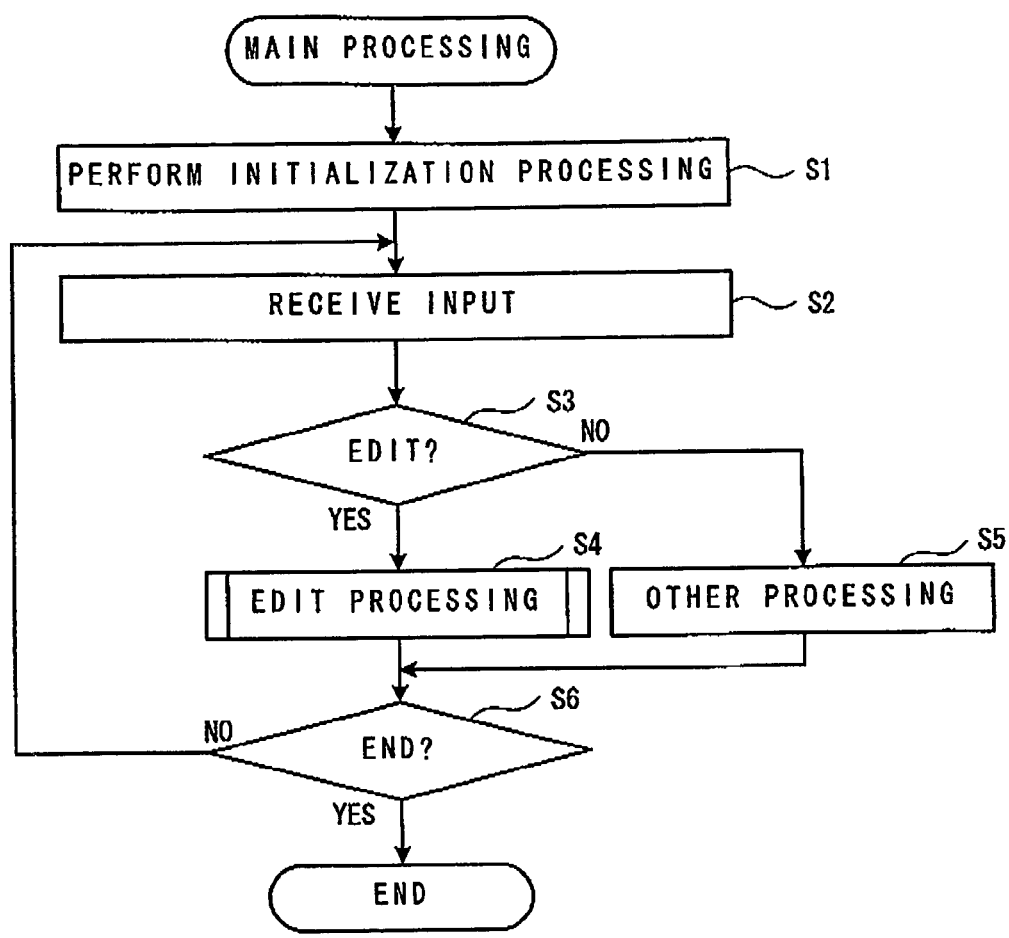
FIG. 14 is a flowchart of main processing of software in which a print data editing program which is related to the disclosure and executed by a CPU is incorporated.

Main processing starts when the software in which the print data editing program is incorporated is executed. As shown in FIG. 14, first the process performs initialization processing on a variety of kinds of data (S1) and, subsequently, receives an input from the mouse 42 or the keyboard 35 (S2). If the input is a command for editing (inputting of a character, size alteration or movement of a print object, insertion of an object, etc.) (YES at S3), the process performs edit processing (see S4 in FIG. 15). If the input is not a command for editing (NO at S3), the process performs other processing (S5). In this case, if a command to "PRINT" is given, the process creates print data based on image data prepared through the edit processing and transmits the created print data to the printer 1. Then, the process decides whether a command to end processing is received from the mouse 42 or the keyboard 35 (S6) and, if such is the case (YES at S6), ends the processing. If a command to end the processing is not received (NO at S6), the process returns to S2 to decides a command (S3) of a received input (S2) and perform processing in accordance with this command (S4, S5). Until an end command is received (YES at S6), the process repeats processing of S2 through S6 to perform processing in accordance with a command from the mouse 42 or the keyboard 35.

Figure 15:
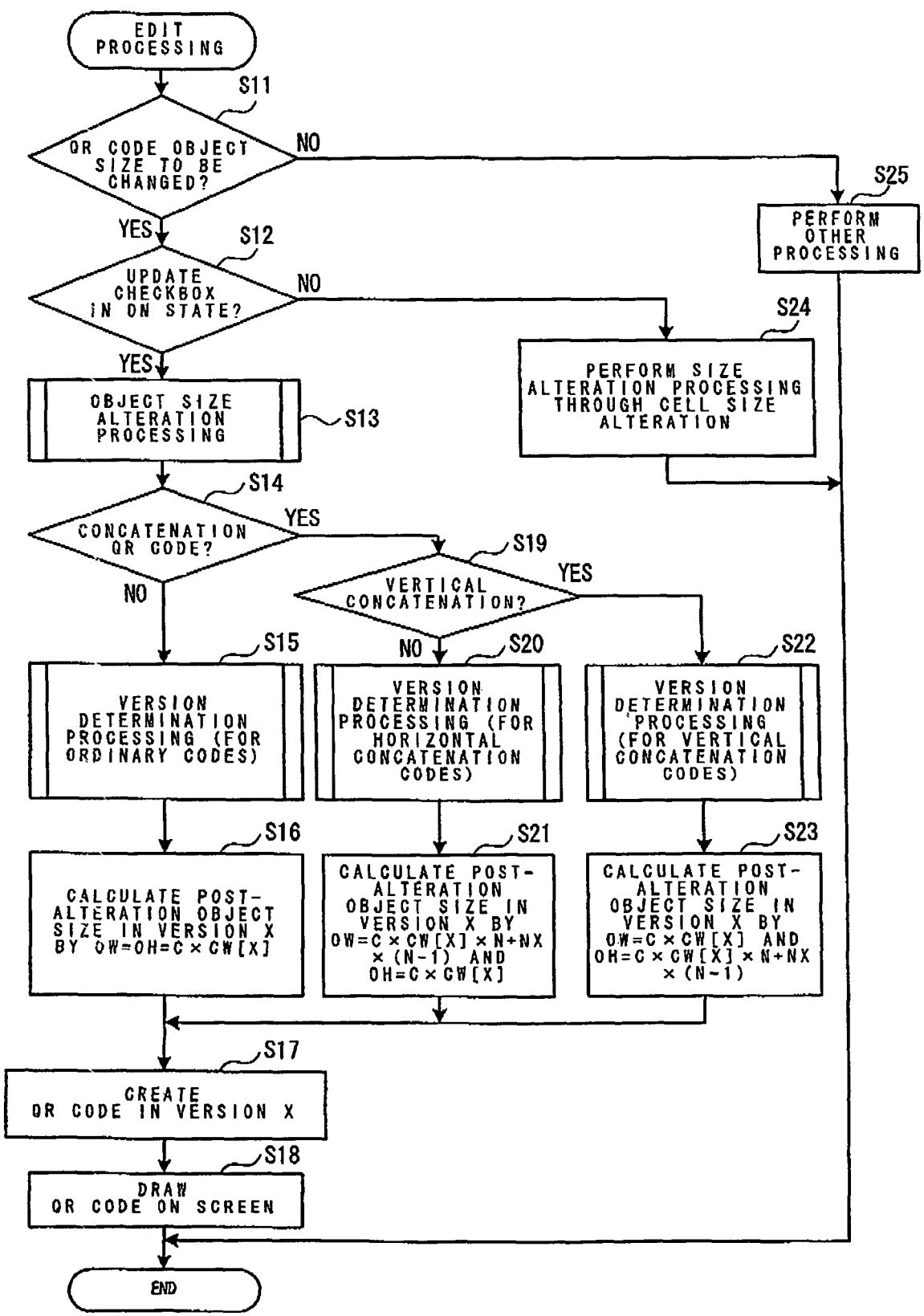
FIG. 15 is a flowchart of edit processing which is performed in the main processing.

In the edit processing, as shown in FIG. 15, the process decides whether an edit command instructs to change a size of the QR code object 150 (S11). If the mouse cursor 155 is present at the handle 151 of the QR code object 150 in a condition where the mouse button is held down, the process decides the command instructs alteration of the size of the QR code object 150 (YES at S11). If, then, the mouse cursor 155 is not present at the handle 151 or the mouse button is not pressed even if the mouse cursor is present at the handle 151 (NO at S11), the process decides that the command does not instruct alteration of the size of the QR code object 150 and performs other processing (S25) and returns to the main processing.

If the command instructs alteration of the size of the QR code object 150 (YES at S11), the process decides whether it is set to change a version in accordance with a size (whether the update check box 263 is set ON) in property information of the QR code object 150 of the handle 151 at which the mouse cursor 155 is present (S12). If such is not the case (NO at S12), a cell size is changed to change the size of the QR code object 150, so that the process performs size update processing owing to this change in cell size (S24) and returns to the main processing.

At S24, the process re-creates the QR code object 150 by changing the cell size with respect to a current cell size (cell size selected in the cell size selection combo box 287 on the barcode property screen 230 (see FIG. 8)). For example, in a case where "MEDIUM" is selected in the cell size selection combo box 287 and the handle 151 of the QR code object 150 is moved by dragging it in a scale-up direction, the process decides whether each side of a square determined by coordinates of left top of the QR code object 150 and coordinates of the mouse cursor 155 at a point in time when the dragging is finished exceeds each side of the QR code object in a case where the cell size is set to "MEDIUM LARGE". If such is not the case, the cell size is left unchanged at "MEDIUM". Otherwise, the process decides whether it exceeds each side of the QR code object 150 in a case where the cell size is set to "LARGE" and, if such is the case, sets the cell size to "LARGE" and, otherwise, to "MEDIUM LARGE".

On the other hand, if the handle 151 of the QR code object 150 is moved by dragging in a scale-down direction, the process decides whether each side of a square determined by coordinates of a left top of the QR code object 150 and coordinates of the mouse cursor 155 at a point in time when the dragging is finished is smaller than each of the QR code object 150 in a case where the cell size is set to "MEDIUM SMALL". If it is not smaller, the cell size is left unchanged at "MEDIUM". Otherwise, the process decides whether it is smaller than each side of the QR code object 150 in a case where the cell size is set to "SMALL" and, if such is the case, sets the cell size "SMALL" and, otherwise, to "MEDIUM SMALL".

Figure 16:
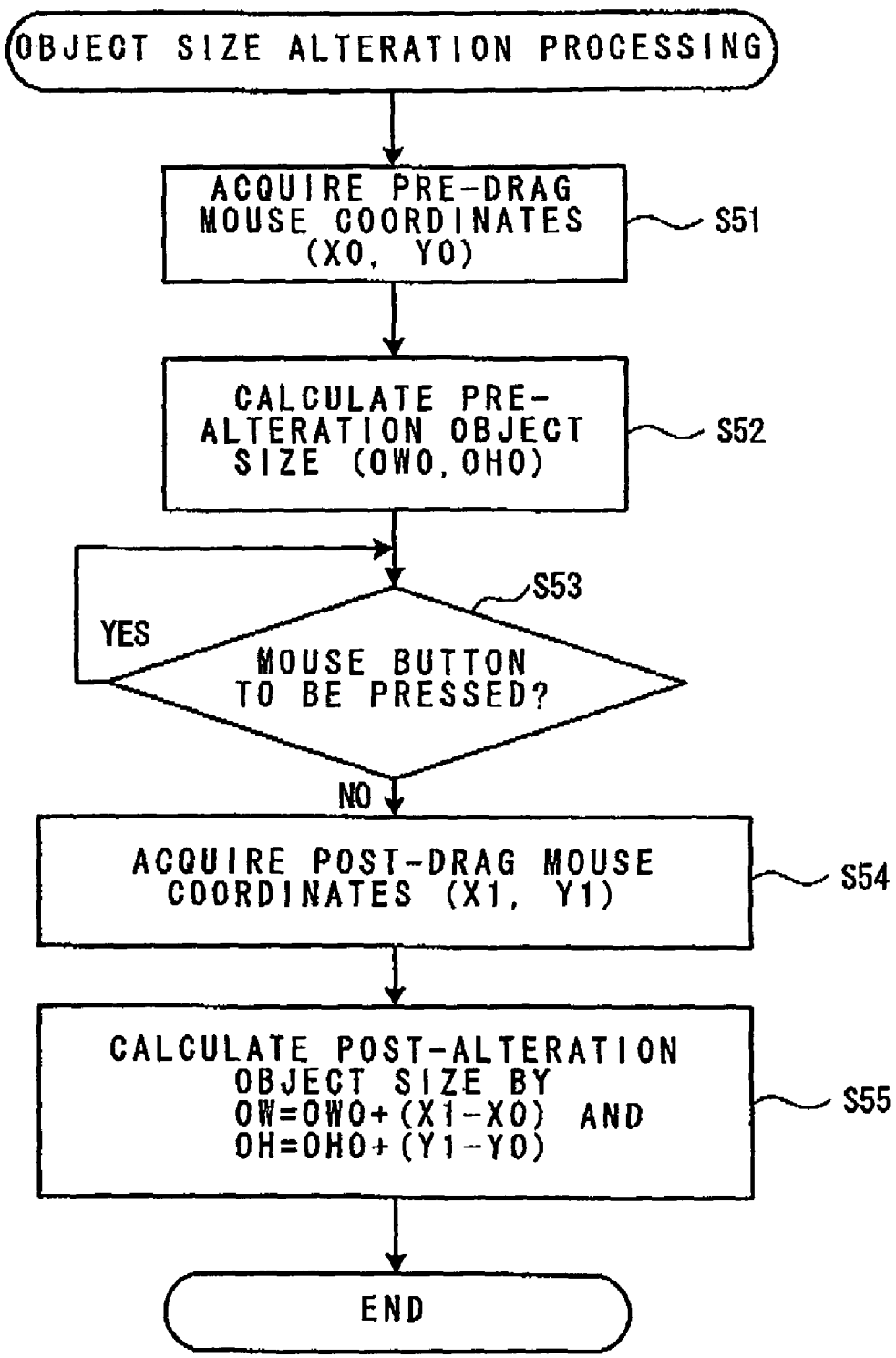
FIG. 16 is a flowchart of object size alteration processing which is performed in the edit processing.

If it is set that a version may be changed in accordance with a size (YES at S12), the process performs object size alteration processing (see S13 of FIG. 16). As shown in FIG. 16, in the object size alteration processing, first, (X0,Y0) are acquired as the current coordinates (pre-drag coordinates) of the mouse cursor 155 (S51). Based on the acquired coordinates (X0,Y0) and the left top coordinates of the QR code object 150 stored in the property information, the process calculates the current (pre-size alteration) sizes OWO (horizontal size) and OHO (vertical size) of the QR code object 150 (S52). Then, the process decides whether the mouse button is held down (S53). If the mouse button is held down (YES at S53), the process decides that dragging is being performed and repeatedly confirms that the mouse button is held down (S53).

If it is not detected that the mouse button is held down (NO at S53), the process decides that dragging is finished and acquires (X1,Y1) as the post-drag coordinates of the mouse (S54). Based on the pre-drag mouse coordinates (X0,Y0), the acquired coordinates (X1,Y1), and the current (pre-size alteration) sizes OWO and OHO of the QR code object 150, the process calculates post-size alteration sizes OW (horizontal size) and OH (vertical size) of the QR code object 150 (S55). Specifically, the process calculates them by using OW=OWO+(X1−X0) and OH=OHO+(Y1−Y0). Then, the process ends the processing and returns to the edit processing.

As shown in FIG. 15, in the edit processing, when the object size alteration processing ends (S13), the process decides whether a QR code object exposed to a size alteration command is a concatenation QR code (S14). The concatenation QR code needs different processing because one piece of data is stored using a plurality of QR codes. Therefore, if it is an ordinary QR code rather than a concatenation QR code (NO at S14), the process performs version determination processing for ordinary QR codes (see S15 of FIG. 17). This version determination processing (ordinary processing) is a subroutine that transfers a version whose value has been changed to a return value to the edit processing.

Figure 17:
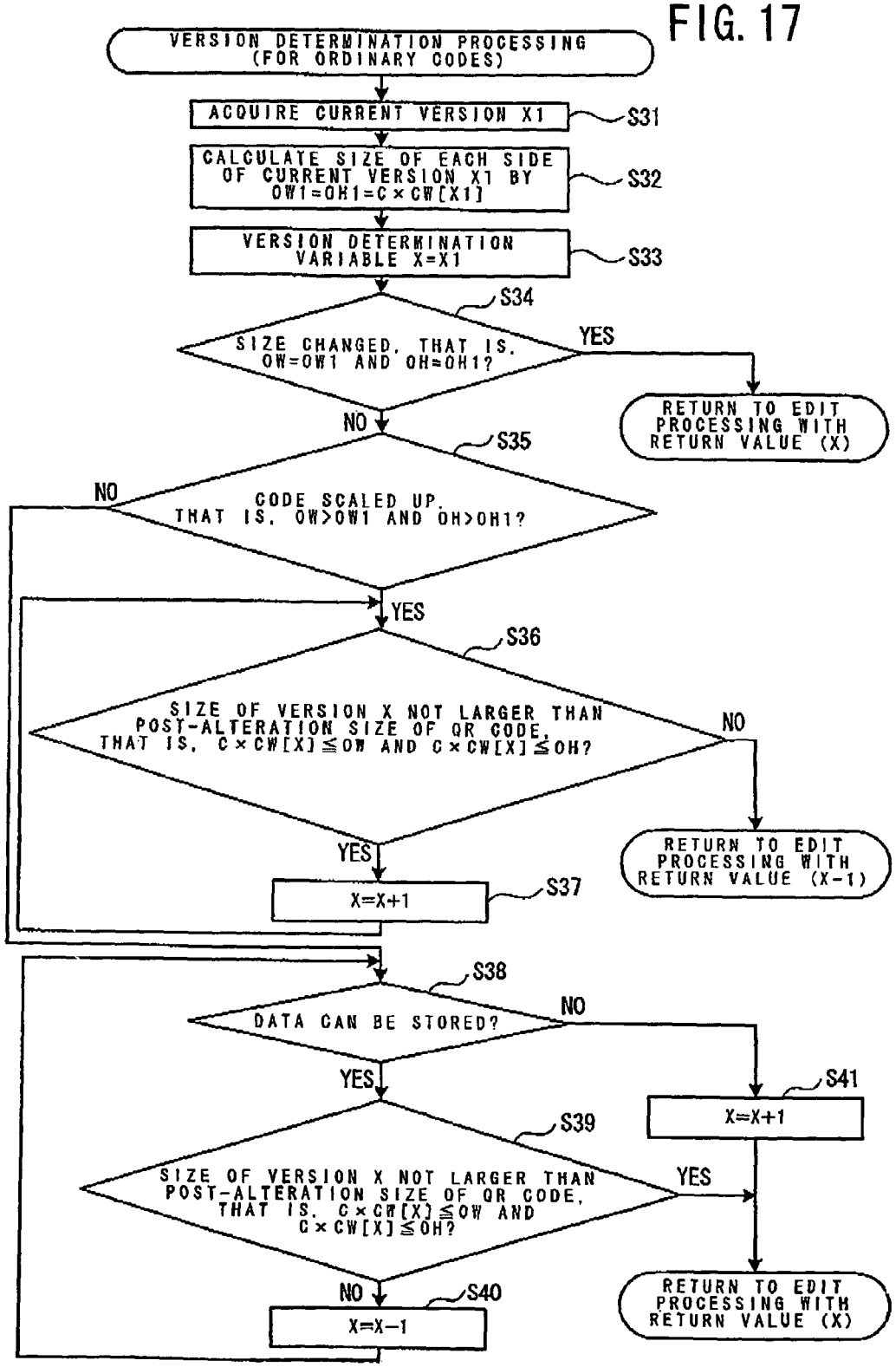
FIG. 17 is a flowchart of version determination processing for ordinary QR codes which is executed in the edit processing.

In the version determination processing (ordinary processing), as shown in FIG. 17, the process acquires as X1 a current version number stored in the property information (S31). Then, the process calculates sizes OW1 (horizontal size) and OH1 (vertical size) of each side of a QR code for the current version number X1 based on a cell width C and the number of cells CW[X1] for the version number X1 (S32). Specifically, they are calculated by using OW1=OH1=C×CW[X1]. It is to be noted that CW[X1]=4×X1+17.

The process sets X1 as an initial value in a version determination variable X to determine a version (S33). First, the process decides whether the size has been changed (S34). If OW=OW1 and OH=OH1, that is, a post-alteration horizontal size OW of the QR code object 150 is equal to a horizontal size OW1 of each side for the pre-alteration version number X1 and the post-alteration vertical size OH is equal to the vertical size OH1 of each side for the pre-alteration version number X1 (YES at S34), the process decides that the size is not changed. Accordingly, in a case where the size is not changed yet (YES at S34), the process sets as a return value the version determination variable X (i.e., the pre-alteration version number X1 set at S33) and returns to the edit processing.

If the size has been changed (NO at S34), the process decides whether the QR code object 150 has been scaled up (S35). If OW>OW1 and OH>OH1, that is, the post-alteration horizontal size OW of the QR code object 150 is larger than the horizontal size OW1 of each side for the pre-alteration version number X1 and the post-alteration vertical size OH of the QR code object 150 is larger than the vertical size OH1 of each side for the pre-alteration version X1 (YES at S35), the process decides that the QR code object 150 has been scaled up and goes to S36. If conditions of OW>OW1 and OH>OH1 are not satisfied (NO at S35), the process decides that the QR code object 150 is not scaled up, that is, it has been scaled down and goes to S38.

In a case where the QR code object 150 has been scaled up (YES at S35), if the version number is equal to a value of the version determination variable X (hereinafter referred to as version X), the process decides whether it is not larger than a post-alteration size of the QR code object 150 (S36). If C×CW[X]≦OW and C×CW[X]≦OH that is, if the size C×CW[X] of each side of the QR code for the version X is not larger than the post-alteration horizontal size OW and also not larger than the post-alteration vertical size OH (YES at S36), it means that the QR code for the version X is included in the post-alteration QR code object 150. Therefore, to examine a version whose version number is increased by 1 (whose size is increased), one (1) is added to the version determination variable X (S37). With this, a version whose version number is increased by 1 is examined (S36). If the size of the QR code of the version X whose version number is increased by 1 is not larger than a post-alteration size of the QR code object (YES at S36), 1 is added further to the version determination variable X (S37), to examine a version whose version number is increased by 1 (S36).

If the size of the QR code of the version X exceeds a post-alteration size of the QR code object (NO at S36), the process decides that the version X is of a version number (lowest version number of those larger than a post-alteration size of the QR code object 150) which is one larger than a highest version number (largest-sized version number) of those not larger than a post-alteration size of the QR code object 150. Accordingly, the process sets (the version determination variable X−1) as a return value and returns to the edit processing.

For example, suppose such a case that a cell size is four dots, the current version X1 is "5", and the post-alteration object sizes (OW, OH) are 185 dots. The process acquires the current version X1=5 (S31) and calculates a size of each side for the current version X1 is OW1=OH1=4×(4×5+17)=148 (S32). Further, the process sets the version determination variable X=5 (S33). Since OW=OH=185 and OW1=OH1=148, the process decides that the size has been changed (NO at S34) and, since OW=OH=185>OW1=OH1=148, decides that the code has been scaled up (YES at S35). Further, since the size of each side for version X(5) is C×CW[5]=4×(4×5+17)=148 and 148<post-alteration size OW=OH=185, the process decides that the version X(5) has a size not larger than that of the post-alteration QR code object (YES at S36).

Then, "1" is added to the version determination variable X(5) to provide "6" (S37). For version 6, the size of the version X(6) is C×CW[6]=4×(4×6+17)=164<post-alteration size OW=OH=185, so that the process decides that the version X(6) has a size not larger than a post-alteration size of the QR code object (YES at S36). Therefore, "1" is added to the version determination variable X(6) to provide "7" (S37). For version 7, the size of the version X(7) is C×CW[7]=4×(4×7+17)=180<post-alteration size OW=OH=185, so that the process decides that the version X(7) has a size not larger than a post-alteration size of the QR code object (YES at S36).

Therefore, "1" is added to the version determination variable X(7) to provide "18" (S37). For version 8, the size of the version X(8) is C×CW[8]=4×(4×8+17)=196>post-alteration size OW=OH=185, so that the process decides that the version X(8) has a size larger than a post-alteration size of the QR code object (NO at S36). Accordingly, the process sets X−1=7 as a return value, that is, determines "7" as the version number and returns to the edit processing.

If the process decides at S35 that conditions of OW>OW1 and OH>OH1 are not satisfied and the code has been scaled down (NO at S35), the process decides whether data to be stored in the QR code object 150 (data input in the data input field of the barcode property screen 210) can be stored for the version X (S38). An amount of data that can be stored in a QR code is determined depending on its version, a correction level, etc. Further, the number of characters that can be stored depends also on a character type (numeric character, alphanumeric character, binary, Kanji character, etc.). Therefore, at this step of S38, the process sets data to be stored in the QR code object 150, various settings (property information), and the version determination variable X to a library for creation of QR code so that the code creation is executed. If an error is not returned from the library, the process decides that "data can be stored" and, if an error is returned, decides that "data cannot be stored". For example, when a QR code is of model 2, the version number is 10, and an error correction level is 7%, up to 690 characters can be stored if the data comprises only numeric characters.

If it is decided that data cannot be stored (NO at S38), it is necessary to upgrade the version number by 1 (one) so that data can be stored, so that the process adds "1" to the version determination variable X (S41) and sets X as a return value and then returns to the edit processing.

If it is decided that data can be stored (YES at S38), the process decides whether a size for the version X is not larger than a post-alteration size of the QR code object (S39). If conditions of C×CW[X]≦OW and C×CW[X]≦OH are not satisfied, that is, a size C×CW[X] of each side of the QR code for the version X is larger than a post-alteration horizontal size OW or larger than a post-alteration vertical size OH (NO at S39), the process decides that the post-alteration QR code object 150 is included in a QR code of the version X and, therefore, examines a version whose version number is decreased by 1 (whose size is smaller). With this, the process subtracts 1 from the version determination variable X (S40). Then, a version whose version number is decreased by 1 is examined (S38, S39).

If data cannot be stored for a version X whose version number is decreased by 1 (NO at S38), it is necessary to upgrade the version size by 1 so that data can be stored, so that the process adds "1" to the version determination variable X (S41) and sets X as a return value and then returns to the edit processing. If data can be stored for a version whose version number is decreased by 1 (YES at S38), the process decides whether a size of a QR code of that version X is not larger than a post-alteration size of the QR code object (S39). If the size of the version X whose version number is decreased by 1 is larger than a post-alteration size of the QR code object (NO at S39), the process further subtracts 1 from the version determination variable X (S40) to examine a version whose version number is decreased by 1 (S38 and S39).

Then, if the size of the QR code of the version X is not larger than a post-alteration size of the QR code object (YES at S39), the version X is of a largest version number of those not larger than the post-alteration size of the QR code object 150. Accordingly, the process sets the version determination variable X as a return value and returns to the edit processing.

For example, suppose such a case that a cell size is four dots, a current version X1 has a version number of "5", and a post-alteration object size (OW, OH) is 120 dots. The process acquires the current version X1=5 (S31) and calculates a size of each side of the current version X1 to be OW1=OH1=4×(4×5+17)=148 (S32). Then, the process sets the version determination variable X=5 (S33). Since OW=OH=120 and OW1=OH1=148, the process decides that a size has been changed (NO at S34) and, since OW=OH=120<OW1=OH1=148, decides that the code has been scaled down (NO at S35). In the present example, it is supposed that data can be stored in the version X(5) (YES at S38). Since a size of each side of the version X(5) is C×CW[5]=4×(4×5+17)=148 and 148>post-alteration size OW=OH=120, the process decides that the size of the version X(5) is larger than the post-alteration size of the QR code object (NO at S39).

Then, the process subtracts "1" from the version determination variable X(5) to provide "4" (S40). In the present example, it is supposed that data can be stored in the version X(4) (YES at S38). For version 4, the size of the version X(4)=C×CW[4]=4×(4×4+17)=132>post-alteration size OW=OH=120, so that the process decides that the size of the version X(4) is larger than the post-alteration size of the QR code object (NO at S39). Therefore, the process subtracts "1" from the version determination variable X(4) to provide "3" (S40). In the present example, it is supposed that data can be stored in the version X(3) (YES at S38). For version 3, a size of the version X(3)=C×CW[3]=4×(4×3+17)=116<post-alteration size OW=OH=120, so that the process decides that the size of the version X(3) is not larger than the post-alteration size of the QR code object (YES at S39). Therefore, the process sets X=3 as a return value, that is, determines the version number to be "3" and returns to the edit processing.

In the edit processing, as shown in FIG. 15, when ordinary version determination processing for a QR code is finished (S15), the process calculates a size of the QR code object 150 in a version determination variable X (of post-alteration version) transferred as a return value from the version determination processing (ordinary processing) (S16). Specifically, it is given as OW=OH=C×CW[X]. Then, the process sets the version determination variable X to a version of the property information and various settings (property information) to a QR code creation library and executes the processing, to create a QR code for the version X (S17). The QR code created at S17 is displayed in the work area of the editor 100 (S18) and the process ends the edit processing and then returns to the main processing.

If a QR code object commanded to be exposed to size alteration in the edit processing shown in FIG. 15 is a concatenation QR code (YES at S14), the process decides whether the concatenation QR code is of vertical concatenation based on property information (whether the vertical concatenation check box 275 in the concatenation setting field 270 on the barcode property screen 230 shown in FIG. 8 is checked) (S19). If it is not of vertical concatenation but of horizontal concatenation (NO at S19) the process executes the version determination processing for horizontal QR codes (see S20 of FIG. 18). This version determination processing (for horizontal concatenation) is a subroutine that transfers a version whose value has been changed to a return value to the edit processing like the version determination processing for ordinary codes.

Figure 18:
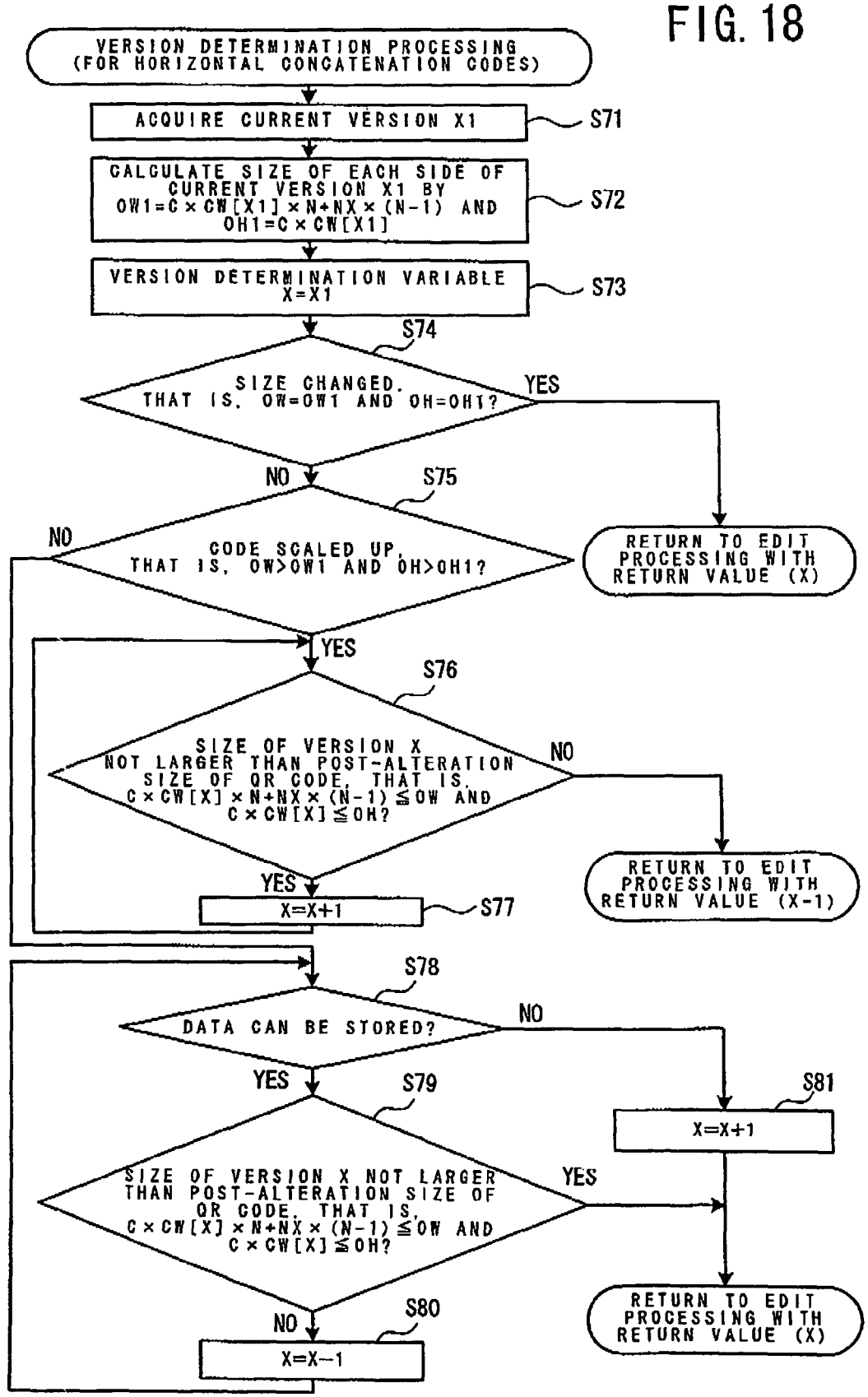
FIG. 18 is a flowchart of version determination processing for horizontal concatenation QR codes which is executed in the edit processing.

In the version-determination processing (for horizontal concatenation), as shown in FIG. 18, a current version stored in the property information is acquired as X1 (S71). A horizontal size OW1 and a vertical size OH1 of the concatenation QR code in the current version X1 are calculated on the basis of a cell width C, the number of cells CW[X1] in the version X1, the number N of divided QR codes, and a margin NX between the divided QR codes (S72). Specifically, they are calculated using OW1=C×CW[X1]×N+NX×(N−1) and OH1=C×CW[X1]. It is to be noted that CW[X1]=4×X1+17 is established.

X1 is set as an initial value in the version determination variable X (S73). Then, first the process decides whether size alteration has been performed (S74). If OW=OW1 and OH=OH1, that is, a post-alteration horizontal size OW is equal to a pre-alteration horizontal size OW1 of each side of the version X1 and a post-alteration vertical size OH is equal to a pre-alteration vertical size OH1 of each side of the version X1 (YES at S74), the process decides that size alteration has not been performed. If it is decided that size alteration has not been performed (YES at S74), the process sets the version determination variable X (i.e., the same value as the pre-alteration version X1 set at S73) as a return value and returns to the edit processing.

If size alteration is not specified (NO at S74), the process decides whether the QR code object 150 has been scaled up (S75). If OW>OW1 and OH>OH1, that is, a post-alteration horizontal size OW is larger than a pre-alteration horizontal size OW1 of each side of the version X1 and a post-alteration vertical size OH is larger than a pre-alteration vertical size OH of each size of the version X1 (YES at S75), the process decides that the code has been scaled up and goes to S76. If conditions of OW>OW1 and OH>OH1 are not satisfied (NO at S75), the process decides that the code has not been scaled up, that is, it has been scaled down and goes to S78.

In a case where the code has been scaled up (YES at S75), if the version is of a value of the version determination variable X, the process decides whether it is not larger than a post-alteration size of the concatenation QR code (S76). If C×CW[X]×N+NX×(N−1)≦OW and C×CW[X]<OH, that is, a horizontal length C×CW[X]×N+NX×(N−1) of the concatenation QR code for version X is not larger than a post-alteration horizontal size OW and a height C×CW[X] of the concatenation QR code is not larger than a post-alteration vertical size OH (YES at S76), it means that the QR code of version X is included in the post-alteration QR code object 150, so that the process examines a version whose version number is increased by 1 (whose size is increased). Therefore, 1 is added to the version determination variable X (S77). And, a version whose version number is increased by 1 is examined (S76). If the size of the QR code of the version X whose version number is increased by 1 is not larger than a post-alteration size of the QR code object (YES at S76), 1 is further added to the version determination variable X (S77), to examine a version whose version number is increased by 1 (S76).

If the size of the QR code of version X exceeds a post-alteration size of the QR code object (NO at S76), the process decides that version X is of a version number (lowest version number of those larger than a post-alteration size of the QR code object 150) which is one larger than a highest version number (largest-sized version number) of those not larger than a post-alteration size of the QR code object 150. Accordingly, the process sets (the version determination variable X−1) as a return value and returns to the edit processing.

For example, suppose such a case that a cell size is four dots, the current version X1 is "5", and post-alteration horizontal size (OW) and vertical size (OH) are 470 dots and 150 dots respectively, the number of divisions (N) is three, and a margin (NX) between divided QR codes is eight dots. The process acquires the current version X1=5 (S71) and calculates the horizontal size OW1=4×(4×5+17)×3+8×(3−1)=460 and the vertical size OH1=4×(4×5+17)=148 of the current version X1 (S72). Further, the process sets the version determination variable X=5 (S73). Since OW=470, OH=150, OW1=460, and OH1=148, the process decides that the size has been changed (NO at S74) and since OW=470>OW1=460 and OH=150>OH1=148, decides that the code has been scaled up (YES at S75). For the version X(5), the horizontal size is C×CW[5]×3+8×(3−1)=148×3+16=460 and the vertical size is C×CW[5]=4×(4×5+17)=148. Since the horizontal size of the version X(5)=460<post-alteration horizontal size OW=470 and the vertical size of the version X(5)=148<post-alteration vertical size OH=150, the process decides that the version X(5) has a size not larger than a post-alteration size of the QR code object (YES at S76).

Then, "1" is added to the version determination variable X(5) to provide "6" (S77). For version 6, the horizontal size of the version X(6) is C×CW[6]×3+8×(3−1)=4×(4×6+17)×3+16=164×3+16=508>post-alteration vertical size OW=470 and a vertical size of the version X(6) is C×CW[6]=4×(4×6+17)=164>post-alteration vertical size OH=150. Therefore, the process decides that the version X(6) has a size larger than a post-alteration size of the QR code object (NO at S76). Accordingly, the process sets X−1=5 as a return value, that is, determines the version number to be "5" and returns to the edit processing.

If the process decides at S75 that conditions of OW>OW1 and OH>OH1 are not satisfied and the code has been scaled down (NO at S75), the process decides whether data to be stored in the concatenation QR code object 150 (data input in the data input field of the barcode property screen 210) can be stored for the version X (S78). The process sets data of the QR code object 150, various settings (property information), and the version determination variable X as a version to a library that creates a QR code and executes the processing and, if an error is returned to indicate that the data cannot be stored (NO at S78), adds "1" to the version determination variable X because it is necessary to increase the version size by one to store the data (S81), and sets X as a return value and then returns to the edit processing.

If an error is not returned from the library to indicate that the data can be stored (YES at S78), for version X the process decides whether its size is not larger than a post-alteration size of the QR code object (S79). If conditions of C×CW[X]×N+NX×(N−1)<OW and C×CW[X]<OH are not satisfied, that is, a horizontal size C×CW[X]×N+NX×(N−1) of the concatenation QR code for version X is larger than a post-alteration horizontal size OW and a vertical size C×CW[X] is larger than a post-alteration vertical size OH (NO at S79), it means that the concatenation QR code of version X is included in the post-alteration QR code object 150, so that in order to examine a version whose number is decreased by 1 (whose size is decreased), 1 is subtracted from the version determination variable X (S80). Then, a version whose version number is decreased by 1 is examined (S78, S79).

If data cannot be stored with the version X whose version number is decreased by 1 (No at S78), it is necessary to store the data by increasing a size of the version by 1, so that the process adds "1" to the version determination variable X (S81), sets X as a return value, and returns to the edit processing. If data can be stored with a version whose version number is decreased by 1 (YES at S78), on the other hand, the process decides whether a size of the concatenation QR code of that version X is not larger than a post-alteration size of the QR code object (S79). If it is larger than a post-alteration size of the QR code object (NO at S79), 1 is subtracted further from the version determination variable X (S80), to examine a version whose version number is decreased by 1 (S79).

If the size of the concatenation QR code of the version X becomes equal to or less than a post-alteration size of the QR code object (YES at S79), the process decides that the version X is of a highest version number of those whose size is not larger than a post-alteration size of the QR code object 150. Accordingly, the process sets the version determination variable X as a return value and returns to the edit processing.

For example, suppose such a case that a cell size is four dots, the current version X1 is "5", post-alteration horizontal and vertical sizes OW and OH are 425 dots and 140 dots respectively, the number of divisions (N) is 3, and a margin (NX) between divided QR codes is eight dots. The process acquires the current version X1=5 (S71) and calculates the horizontal size OW1=4×(4×5+17)×3+8×(3−1)=148×3+16=460 and the vertical size OH1=4×(4×5+17)=148 for the current version X1 (S72). Further, the process sets the version determination variable X=5 (S73). Since OW=425, OH=140, OW1=460, and OH1=148, the process decides that the size has been changed (NO at S74) and, since OW=425<OW1=460 and OH=140<OH1=148, decides that the code has been scaled down (NO at S75). In the present example, it is supposed that data can be stored in the version X(5) (YES at S78). Besides, the horizontal size of the version X(5) is C×CW[5]×3+8×(3−1)=460 and the vertical size is C×CW[5]=4×(4×5+17)=148. Since the post-alteration horizontal size OW=425<horizontal size of the version X(5)=460 and the post-alteration vertical size OH=140<vertical size of the version X(5)=148, the process decides that the version X(5) has a size larger than a post-alteration size of the QR code object (NO at S79).

Then, "1" is subtracted from the version determination variable X(5) to provide "4" (S80). In the present example, it is supposed that data can be stored in the version X(4) (YES at S78). For version 4, the horizontal size of the version X(4)=C×CW[4]×3+8×(3−1)=132×3+16=412<post-alteration vertical size OH=425 and the vertical size of the version X(4)=C×CW[4]=4×(4×4+17)=132<post-alteration vertical size OH=140. Therefore, the process decides that the version X(4) has a size not larger than a post-alteration size of the QR code object (YES at S79). Therefore, the process sets X=4 as a return value, that is, determines the version number to be "4" and returns to the edit processing.

In the edit processing, as shown in FIG. 15, when version determination processing for horizontal concatenation is finished (S20), the process calculates a size of the QR code object 150 in a version determination variable X (of post-alteration version) transferred as a return value from the version determination processing (horizontal concatenation) (S21). Specifically, they are given as OW=C×CW[X]×N+NX×(N−1) and OH=C×CW[X]. Then, the process sets the version determination variable X to a version of the property information and various settings (property information) to a QR code creation library and performs the processing, to create a QR code for the version X (S17). The QR code created at S17 is displayed in the work area of the editor 100 (S18) and the process ends the edit processing and then returns to the main processing.

If a QR code object commanded to be exposed to size alteration is a concatenation QR code (YES at S14) and the concatenation is vertical concatenation (YES at S19), the process performs version determination processing for the QR code of vertical concatenation (S22) and calculates a size of the QR code object 150 in a version determination variable X (of post-alteration version) transferred as a return value from the version determination processing (for vertical concatenation) (S23). Specifically, they are given as OW=C×CW[X] and OH=C×CW[X]×N+NX×(N−1). Then, the process sets the version determination variable X to a version of the property information and various settings (property information) to a QR code creation library and executes the processing, to create a concatenation QR code for the version X (S17). The concatenation QR code created at S17 is then displayed in the work area of the editor 100 (S18) and the process ends the edit processing and then returns to the main processing.

The version determination processing (for vertical concatenation) is almost the same as the version determination processing (for horizontal concatenation). However, in contrast to the version determination processing (for horizontal concatenation) performed at S72 in which for the version X1 the horizontal size is given by C×CW[X1]×N+NX×(N−1) and the vertical size is given by C×CW[X1], in the case of the vertical concatenation, divided QR codes are arranged vertically, so that the version determination processing (for the vertical concatenation) for the version X1 the horizontal size is given by C×CW[X1] and the vertical size is given by C×CW[X1]×N+NX×(N−1). Further, although the horizontal size and vertical size of the version X1 are given by C×CW[X1]×N+NX×(N−1) and C×CW[X1] at S76 and S79 respectively, in the case of the vertical concatenation, divided QR codes are arranged vertically, so that in the version determination processing (vertical concatenation) for the version X1 the horizontal size is given by C×CW[X] and the vertical size is given by C×CW[X]×N+NX×(N−1).

In such a manner, if it is commanded to change a size by dragging the handle 151 of the QR code object 150 by using the mouse cursor 155, the size of the QR code object 150 is changed by changing a version of the QR code object 150 to a maximum version that has a size not larger than a region defined by a position (coordinates) at which the dragging is finished and left top coordinates of the QR code object 150 and that is capable of storing storage data of the QR code object 150.

It is thus possible to change the size of the QR code object 150 in finer steps than changing that size by changing a cell size. For example, suppose such a case that a cell size is medium (four dots), the current version number is "5", a size of each side at a position where dragging is finished is 185, and the cell size is either "1 dot" for "SMALL", "2 dots" for "MEDIUM SMALL", "16 dots" for "MEDIUM LARGE", and "8 dots" for "LARGE". In the case of scaling up a size by setting the cell size, if the cell size is set to "MEDIUM LARGE", the size of each side is C×CW[5]=6×(4×5+17)=222 and larger than 185, so that the cell size is left unchanged at "MEDIUM" and is not possible to scale up.

However, in the case of size alteration by use of a version, as described above, the version number is determined to "7" and the size of each side is C×CW[7]=4×(4×7+17)=180 (dots), to be closer to a size at a position where dragging is finished. That is, it is possible to change the size of the QR code object 150 closer to a size desired by an operator. Further, the size of concatenation QR codes can also be changed in the same way as that of ordinary QR codes.

It is to be noted that a print data editing apparatus and a print data editing program of the disclosure are not limited to the above-described embodiment and, of course, can be modified variously within a scope that does not depart from the gist of the disclosure. Although the present embodiment has exemplified the printer 1 as a printer that prints tape, a medium on which information is printed or a printing medium of the printer are not limited to it but, needless to say, may be a printer, an ink-jet printer, etc. that prints information on continuous sheet of paper, a cut sheet of paper, a cloth, etc.

Although in the above embodiment a command to change a size of the QR code object 150 has been executed by moving the handle 151 placed at a position that is below and to the right of the QR code object 150 through operation of the mouse 42, the method to command alteration of the size is not limited to it. For example, besides this position, the handle may be placed to a left top corner, a right top corner, a right bottom corner, or a center of each side. Further, instead of giving a command by moving the handle, a field to specify a size of the QR code object 150 may be provided on the barcode property screen so that a specific numeric character may be input in it. For example, as shown in FIG. 19, the size may be specified with a numeric character on a barcode property screen 240 on which the "LAYOUT" tab 241 is selected.

Figure 19:
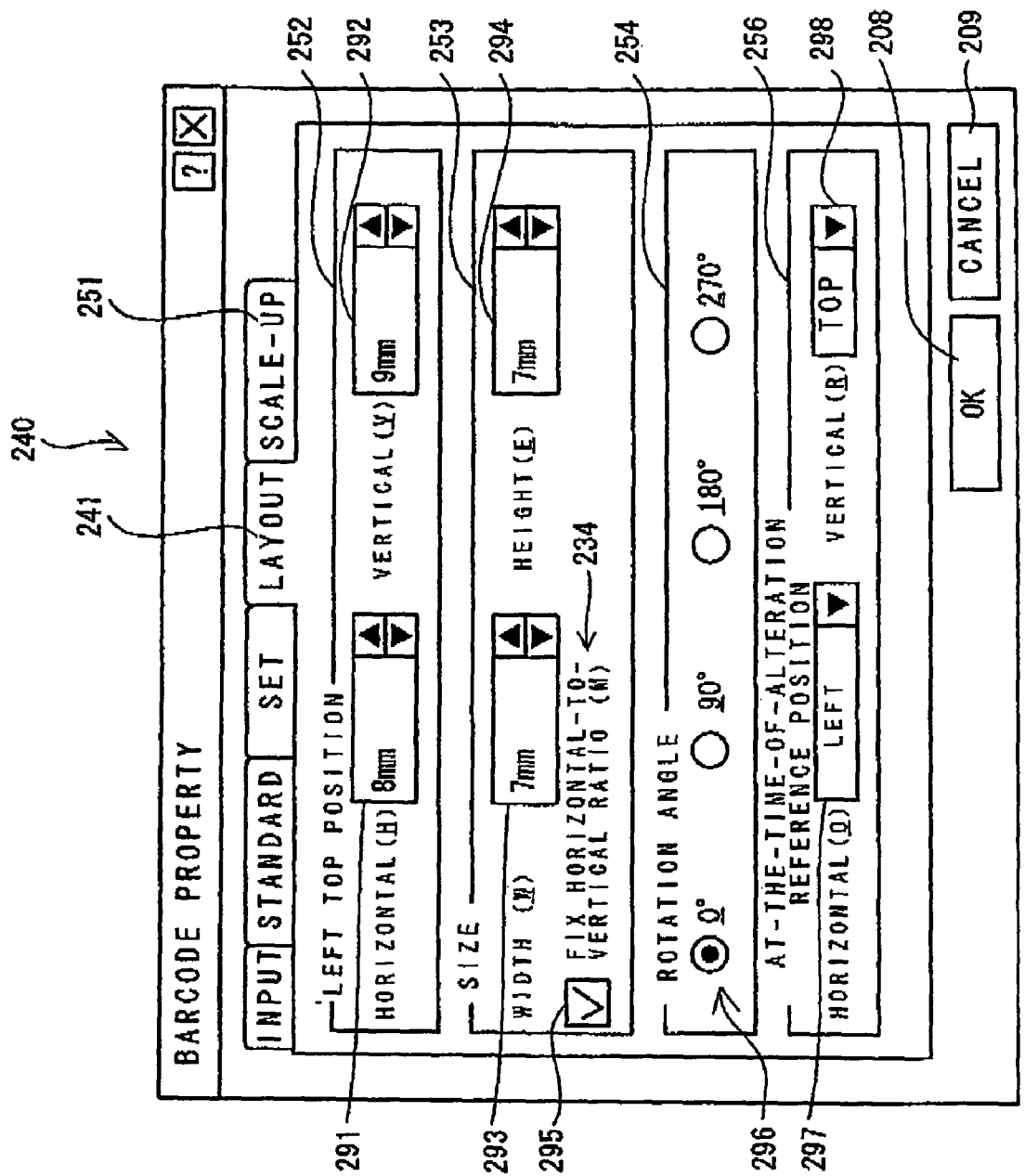
FIG. 19 is an image of a barcode property screen on which a "LAYOUT" tab is selected.

As shown in FIG. 19, by using the "LAYOUT" tab 241, it is possible to specify a QR code layout position, a QR code size, a QR code's rotation angle, and a reference position in a case where a QR code layout is changed. The "LAYOUT" tab 241 has a left top position field 252, a size field 253, a rotation angle field 254, and an at-the-time-of-data-alteration reference position field 256. The left top position field 252 has a horizontal spin button 291 and a vertical spin button 292 that specify a horizontal layout position so that a distance from the left top corner in the work area 120 of the editor 100 can be specified. The rotation angle field 254 has a radio button group 296 for 0°, 90°, 180°, and 270° so that a QR code rotation angle can be selected from among 0°, 90°, 180°, and 270°. Further, at-the-time-of-data-alteration reference position field 256 has a horizontal combo box 297 and a vertical combo box 298 so that a reference position can be specified when a QR code size is changed. For example, in a case where a horizontal reference position is "LEFT" and a vertical reference position is "TOP" as shown in FIG. 9, a size is increased or decreased or rotated around a left top vertex as an axis in a condition where coordinates of this left top vertex is left unchanged.

To the size field 253, a width spin button 293, a height spin button 294, and a horizontal-to-vertical ratio fixing check box 295 are provided. With this, by selecting a numeric character in the width spin button 293 and the height spin button 294, a size of a QR code can be specified. In an example shown in FIG. 19, the size can be specified in millimeter units. However, although the horizontal-to-vertical ratio fixing check box 295 is always in an ON state because an ordinary QR code is square-shaped, in the case of concatenation QR codes, the horizontal-to-vertical ratio fixing check box 295 is not always in the ON state because a size of a concatenation QR code as a whole is specified rather than a size of each of divided QR codes. It is to be noted that the size field 253 may not be such as shown in FIG. 19 but may be a text box in which a numeric character is to be input. Further, the numeric character may be input not in millimeter units but in dot units or inch units. Further, in the case of a concatenation QR code, instead of its size as a whole, the size of a divided QR code may be specified.

Further, in the above embodiment, in determination of a version of a post-alteration QR code object, a version of the post-alteration QR code object 150 has been decided to be a highest-numbered version (largest-sized version) of those that have a QR code size not larger than a size of a square determined by coordinates of the mouse pointer 155 at a point in time when dragging of the mouse 42 is finished and coordinates of a left top corner of the QR code object 150, thereby creating the QR code object 150 of the thus determined version without changing the size of cells. However, it is not necessary to select a highest-numbered version (largest-sized version) of those whose code size is not larger than a size of a specified square but may be a version whose code size is close to that of the specified square as much as possible.

For example, it may be permitted to select a lowest-numbered version (smallest-sized version) of those whose QR code size is not less than a specified square, a lowest-numbered version of those whose QR code size is larger than a specified square, or a highest-numbered version of those whose QR code size is smaller than a specified square. Further, it may be permitted to select a highest-numbered version of those whose QR code size is not larger than a specified square or a lowest-numbered version of those whose QR code size is not less than the specified square, whichever has the size closer to that of the specified square.

Figure 20:
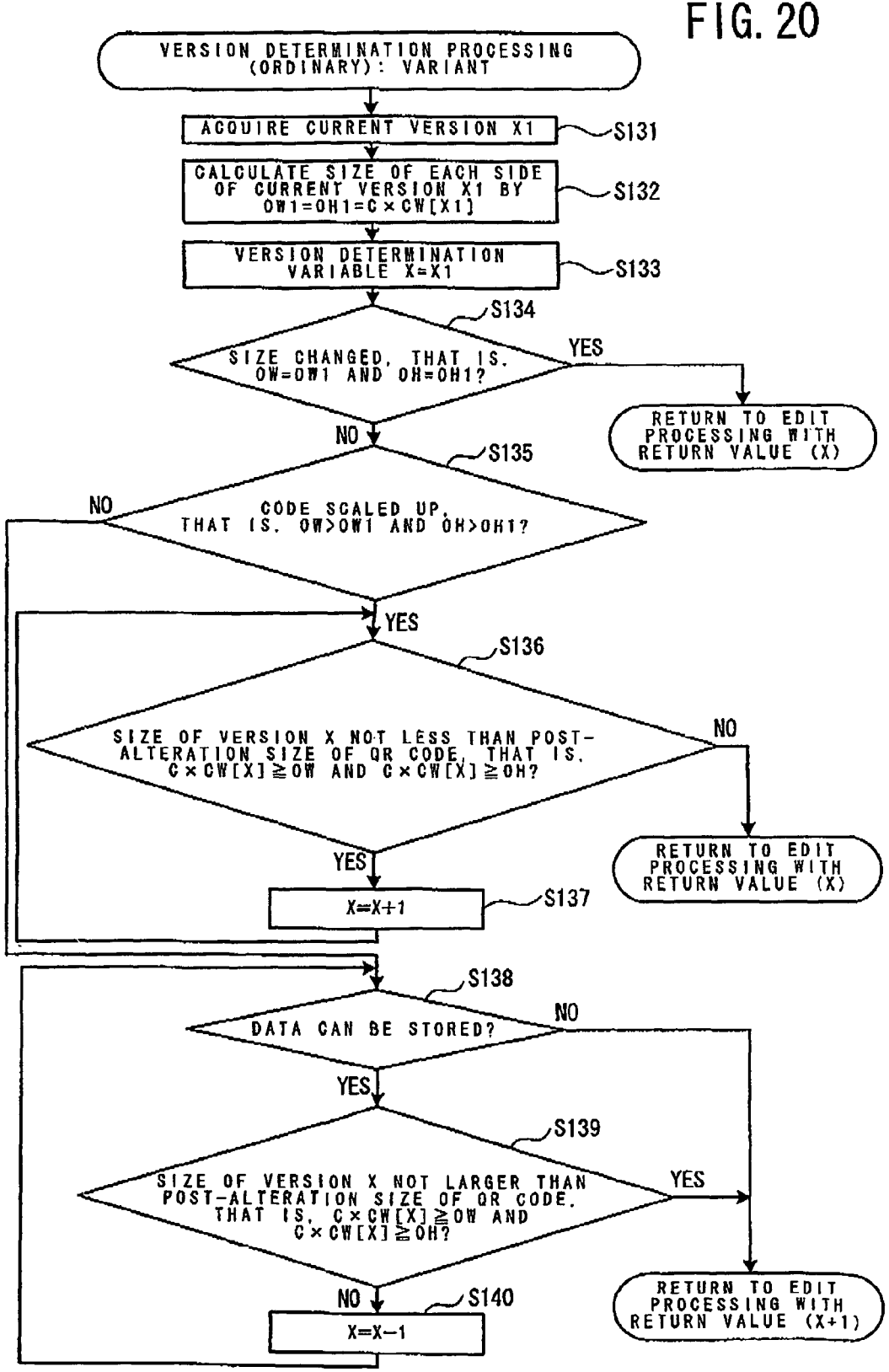
FIG. 20 is a flowchart of a variant of the version determination processing for ordinary QR codes which is executed in the edit processing.

The following will describe the version determination processing for an ordinary QR code in the case of selecting a lowest-numbered version of those whose code size is not less than a specified square, with reference to a flowchart shown in FIG. 20. First, a current version stored in property information is acquired as X1 (S131). Next, the process calculates sizes OW1 (horizontal size) and OH1 (vertical size) of a QR code in the current version X1 based on a cell width C and the number of cells CW[X1] in the version X1 (S132).

Next, X1 is set in the version determination variable X as an initial value (S133). Next, the process decides whether a size has been changed (S134). If OW=OW1 and OH=OH1, that is, a post-alteration horizontal size OW is equal to a pre-alteration horizontal size OW1 of each side of the version X1 and a post-alteration vertical size OH is equal to a pre-alteration vertical size OH1 of each side of the version X1 (YES at S134), the process decides that the size has not been changed. If it is decided that the size has not been changed (YES at S134), the process sets as a return value the version determination variable X (i.e., the same value as the pre-alteration version X1 set at S133) and returns to the edit processing.

If the size has been changed (NO at S134), the process decides whether the QR code object 150 has been scaled up (S135). If OW>OW1 and OH>OH1, that is, a post-alteration horizontal size OW is larger than a pre-alteration horizontal size OW1 of each side of the version X1 and a post-alteration vertical size OH is larger than a pre-alteration vertical size OH1 of each side of the version X1 (YES at S135), the process decides that the code has been scaled up and goes to S136. If conditions of OW>OW1 and OH>OH1 are not satisfied (NO at S135), the process decides that the code has not been scaled up, that is, the code has been scaled down and goes to S138.

If it is decided that the code has been scaled up (YES at S135), the process decides whether the size of the version X is not less than a post-alteration size of the QR code object (S136). If conditions of C×CW[X]>OW and C×CW[X]>OH are not satisfied, that is, a size C×CW[X] of each side of the QR code in the version X is less than the post-alteration horizontal size OW or less than the post-alteration vertical size OH(NO at S136), the process decides that the QR code in the version X is smaller than the post-alteration QR code object and, therefore, to examine a version whose version number is increased by 1, adds 1 to the version determination variable X (S137). Then, the version whose version number is increased by 1 is examined (S136). If the size of the QR code of the version X whose version number has thus been increased by 1 is less than a post-alteration size of the QR code object (NO at S136), 1 is added further to the version determination variable X (S137), to examine a version whose version number is increased by 1 (S136).

If C×CW[X]≧OW and C×CW[X]≧OH, that is, a size C×CW[X] of each side of the QR code of version X is not less than a post-alteration horizontal size OW and CXCW[X] is not less than a post-alteration vertical size OH (YES at S136), the process decides that the QR code of the version X is a QR code having the same size as that of the QR code object or a QR code of a lowest-numbered version (smallest-sized version) of those that are larger than the QR code object and, therefore, sets the version determination variable X as a return value and then returns to the edit processing.

For example, suppose such a case that a cell size is four dots, the current version X1 is "5", and post-alteration object sizes (OW, OH) are each 185 dots. The process acquires the current version X1=5 (S131) and a size of each side of the current version X1 is calculated to be OW1=OH1=4×(4×5+17)=148 (S132). Further, the process sets the version determination variable X=5 (S133). Since OW=OH=185 and OW1=OH1=148, the process decides that the size has been changed (NO at S134) and since OW=OH=185>OW1=OH1=148, decides that the size has been scaled up (YES at S135). For the version X(5), the size of each side is C×CW[5]=4×(4×5+17)=148 and 148<post-alteration size OW=OH=185, so that the process decides that the size of the version X(5) is less than a post-alteration size of the QR code object (NO at S136).

Then, "1" is added to the version determination variable X(5) to provide "6" (S137). For version 6, C×CW[6]=4×(4×6+17)=164<post-alteration size OW=OH=185, so that the process decides that the version X(6) has a size less than a post-alteration size of the QR code object (NO at S136). Accordingly, "1" is added to the version determination variable X(6) to provide "7" (S137). For version 7, C×CW[7]=4× (4×7+17)=180<post-alteration size OW=OH=185, so that the process decides that the version X(7) has a size less than a post-alteration size of the QR code object (NO at S136).

Accordingly, "1" is added to the version determination variable X(7) to provide "8" (S137). For version 8, C×CW[8] =4×(4×8+17)=196>post-alteration size OW=OH=185, so that the process decides that the version X(8) has a size not less than a post-alteration size of the QR code object (YES at S136). Therefore, the process sets X=8 as a return value, that is, determines the version number to be "8" and returns to the edit processing.

If the process decides at S135 that conditions of OW>OW1 and OH>OH1 are not satisfied and the code has been scaled down (NO at S135), the process decides whether data to be stored in the QR code object 150 (data input in the data input field of the barcode property screen 210) can be stored in the version X (S138). If the data cannot be stored (NO at S138), it is necessary to increase the version size by 1 to enable storage of data, so that the process sets the version determination variable X+1 as a return value and returns to the edit processing.

If data can be stored (YES at S138), on the other hand, the process decides whether a size of the QR code of that version X is not less than a post-alteration size of the QR code object (S139). If C×CW[X]≧OW and C×CW[X]≧OH and the size of the version X is not less than a post-alteration size of the QR code object (YES at S139), in order to examine a version whose version number is decreased by 1, the process subtracts 1 from the version determination variable X (S140). Then, the version whose version number is decreased by 1 is examined (S138 and S139).

If data cannot be stored with the version X whose version number has thus been decreased by 1 (NO at S138), it is necessary to further increase the version number by 1 to enable storage of data, so that the process sets the version determination variable X+1 as a return value and returns to the edit processing.

If data can be stored with the version X whose version number has thus been decreased by 1 (YES at S138), the process decides whether the size of the QR code of the version X is not less than a post-alteration size of the QR code object (S139). If the size of the version X whose version number is decreased by 1 is not less than the post-alteration size of the QR code object (YES at S139), 1 is further subtracted from the version determination variable X (S140), to examine a version whose version number is decreased by 1 (S138 and S139).

If conditions of C×CW[X]≧W and C×CW[X]≧OH are not satisfied, that is, a size C×CW[X] of each side of the QR code for the version X is smaller than a post-alteration horizontal size OW and C×CW[X] is smaller than a post-alteration vertical size OH (NO at S139), the version X is a highest-numbered version of those whose size is smaller than a size of the QR code object. Therefore, the process sets as a return value the version determination variable X+1 (lowest-numbered version of those whose size is larger than the size of the QR code object or a version having the same size as that of the QR code object) and returns to the edit processing.

For example, suppose such a case that a cell size is four dots, the current version X1 is "5", and post-alteration object sizes (OW, OH) are each 120 dots. The current version X1=5 is acquired (S131) and a size of each side of the current version X1 is calculated to be OW1=OH1=4×(4×5+17)=148 (S132). Next, the process sets the version determination variable X=5 (S133). Since OW=OH=120 and OW1=OH1=148, the process decides that the size has been changed (NO at S134) and, since OW=OH=120<OW1=OH1=148, decides that the size has been scaled down (NO at S135). In the present example, it is supposed that data can be stored in the version X(5) (YES at S138). Since a size of each side of the version X(5) is C×CW[5]=4×(4×5+17)=148 and 148>post-alteration size OW=OH=120, the process decides that the size of the version X(5) is not less than a post-alteration size of the QR code object (YES at S139).

Accordingly, "1" is subtracted from the version determination variable X(5) to provide "41" (S140). In the present example, it is supposed that data can be stored in the version X(4) (YES at S138). For the version 4, C×CW[4]=4×(4×4+17)=132>post-alteration size OW=OH=120, so that the process decides that the size of the version X(4) is not less than a post-alteration size of the QR code object (YES at S139). Therefore, "1" is subtracted from the version determination variable X(4) to provide "3" (S140). In the present example, it is supposed that data can be stored in the version X(3) (YES at S138). For the version 3, C×CW[3]=4×(4×3+17)= 116<post-alteration size OW=OH=120, so that the process decides that the size of the version X(3) is less than a post-alteration size of the QR code object (NO at S139). Therefore, the process sets X=3+1=4 as a return value, that is, determines the version number to be "4" and returns to the edit processing.

It is to be noted that description of the version determination processing for vertical concatenation and that for horizontal concatenation is omitted because they are different from each other only in calculation of the horizontal size OW1 and the vertical size OH1 of each side of the version X1 to be performed at S132 and values to be compared with the post-alteration horizontal size OW and vertical size OH of the QR code object at S136 and S139. It is to be noted that in the version determination processing for vertical concatenation, at S132, the horizontal size OW1=C×CW[X1] and the vertical size OH1=C×CW[X1]×N+NX×(N−1) are employed and, at S136 and S139, "C×CW[X]≧OW1 and C×CW[X]×N+NX×(N−1)≧OH1" provides a criterion for decision. Further, in the version determination processing for horizontal concatenation, at S132, the horizontal size OW1=C×CW[X1]×N+NX×(N−1) and the vertical size OH1=C×CW[X1] are given and, at S136 and S139, "C×CW[X]×N+NX×(N−1)≧OW1 and C×CW[X]≧OH1" provides a criterion for decision.

As described above, in a print data editing apparatus of the disclosure, a display can display a QR code, which is one type of a two-dimensional code which is represented by an approximately square shape in which a plurality of squared cells, each of which is a structure-wise basic unit, is arranged vertically and horizontally, a size specification device can specify a size of the QR code being displayed on the display, a version determination device can determine a version that specifies the number of the cells that constitute the two-dimensional code, based on the size specified by the size specification device, and a code re-creation device can re-create the QR code whose size has been specified by the size specification device into a QR code of the version determined by the version determination device, without changing a size of the cells. Therefore, the size of each side of a QR code can be changed in finer steps than the case of changing that size by increasing or decreasing a cell size.

In the print data editing apparatus of the disclosure, the version determination device can determine a version of a QR code having a largest size of those whose size is not larger than a size specified by the size specification device. Therefore, it is possible to re-create a QR code whose size is closer to a specified size.

In the print data editing apparatus of the disclosure, the version determination device can determine a version of a QR code having a smallest size of those whose size is not less than a size specified by the size specification device. Therefore, it is possible to re-create a QR code whose size is closer to a specified size.

In the print data editing apparatus of the disclosure, a display control device can display a code re-created by the QR code re-creation device on the display. Therefore, it is possible to confirm a size of each side of a re-created QR code.

In the print data editing apparatus of the disclosure, an output device can create print data of a QR code re-created by the code re-creation device and output it to a printer. Therefore, it is possible to print and use a created QR code.

In the print data editing apparatus of the disclosure, a scale-up/down device can scale up or down a QR code being displayed on the display without changing a size of cells. Further, the size specification device can specify a size of a QR code being displayed on the display by scaling up or down the QR code by using the scale-up/down device. Therefore, it is possible to specify a size of a QR code being displayed on the display by commanding to scale up or down the QR code, thereby determining a size with reference to a size of the QR code being displayed on the display.

In the print data editing apparatus of the disclosure, a numeric character size input device can input a size of a QR code in a numeric character. Further, the size specification device can specify a size of a QR code by specifying this size in a numeric character by using the numeric character size input device. Therefore, it is possible to accurately specify a specific size desired by a user.

In the print data editing apparatus of the disclosure, the size specification device can specify sizes of a plurality of QR codes and hence the sizes of a plurality of QR codes at a time, thus requiring less labor than the case of specifying sizes of QR codes one by one.

The print data editing apparatus of the disclosure can handle divided QR codes into which one QR code is divided in such a manner that they can be concatenated when they are to be read. Therefore, if one QR code is divided, sizes of all of divided QR codes can be specified at a time.

As described above, in a print data editing apparatus of the disclosure, a display can display a QR code, which is one type of a two-dimensional code which is represented by an approximately square shape in which a plurality of squared cells, each of which is a structure-wise basic unit, is arranged vertically and horizontally, a size specification device can specify a size of the QR code being displayed on the display, a controller can determine a version that specifies the number of the cells that constitute the two-dimensional code, based on the size specified by the size specification device, and can re-create the QR code whose size has been specified by the size specification device into a QR code of the version determined, without changing a size of the cells. Therefore, the size of each side of a QR code can be changed in finer steps than the case of changing that size by increasing or decreasing a cell size.

In the print data editing apparatus of the disclosure, the controller can determine a version of a QR code having a largest size of those whose size is not larger than a size specified by the size specification device. Therefore, it is possible to re-create a QR code whose size is closer to a specified size.

In the print data editing apparatus of the disclosure, the controller can determine a version of a QR code having a smallest size of those whose size is not less than a size specified by the size specification device. Therefore, it is possible to re-create a QR code whose size is closer to a specified size.

In the print data editing apparatus of the disclosure, the controller can display a QR code re-created on the display. Therefore, it is possible to confirm a size of each side of a re-created QR code.

In the print data editing apparatus of the disclosure, the controller can create print data of a QR code re-created and output it to a printer. Therefore, it is possible to print and use a created QR code.

In the print data editing apparatus of the disclosure, a scale-up/down device can scale up or down a QR code being displayed on the display without changing a size of cells. Further, the size specification device can specify a size of a QR code being displayed on the display by scaling up or down the QR code by using the scale-up/down device. Therefore, it is possible to specify a size of a QR code being displayed on the display by commanding to scale up or down the QR code, thereby determining a size with reference to a size of the QR code being displayed on the display.

In the print data editing apparatus of the disclosure, a numeric character size input device can input a size of a QR code in a numeric character. Further, the size specification device can specify a size of a QR code by specifying this size in a numeric character by using the numeric character size input device. Therefore, it is possible to accurately specify a specific size desired by a user.

In the print data editing apparatus of the disclosure, the size specification device can specify sizes of a plurality of QR codes and hence the sizes of a plurality of QR codes at a time, thus requiring less labor than the case of specifying sizes of QR codes one by one.

The print data editing apparatus of the disclosure can handle divided QR codes into which one QR code is divided in such a manner that they can be concatenated when they are to be read. Therefore, if one QR code is divided, sizes of all of divided QR codes can be specified at a time.

In a print data editing program of the disclosure that is stored in a computer-readable storage medium, a display step can display a QR code, which is one type of a two-dimensional code which is represented by an approximately square shape in which a plurality of squared cells, each of which is a structure-wise basic unit, is arranged vertically and horizontally, a size specification step can specify a size of the QR code being displayed at the display step, a version determination step can determine a version that specifies the number of the cells that constitute the two-dimensional code, based on the size specified at the size specification step, and a code re-creation step can re-create the QR code whose size has been specified at the size specification step into a QR code of the version determined at the version determination step, without changing a size of the cells. Therefore, the size of each side of a QR code can be changed in finer steps than the case of changing that size by increasing or decreasing a cell size.

In the print data editing program of the disclosure, the version determination step can determine a version of a QR code having a largest size of those whose size is not larger than a size specified at the size specification step. Therefore, it is possible to re-create a QR code whose size is closer to a specified size.

In the print data editing program of the disclosure, the version determination step can determine a version of a QR code having a smallest size of those whose size is not less than a size specified at the size specification step. Therefore, it is possible to re-create a QR code whose size is closer to a specified size.

In the print data editing program of the disclosure, a display control step can display a QR code re-created at the code re-creation step on the display. Therefore, it is possible to confirm a size of each side of a re-created QR code.

In the print data editing program of the disclosure, an output step can create print data of a QR code re-created at the code re-creation step and output it to a printer. Therefore, it is possible to print and use a created QR code.

In the print data editing program of the disclosure, a scale-up/down step can scale up or down a QR code being displayed at the display step without changing a size of cells. Further, the size specification step can specify a size of a QR code being displayed at the display step by scaling up or down the QR code by using the scale-up/down step. Therefore, it is possible to specify a size of a QR code being displayed on the display by commanding to scale up or down the QR code, thereby determining a size with reference to a size of the QR code being displayed on the display.

In the print data editing program of the disclosure, a numeric character size input step can input a size of a QR code in a numeric character. Further, the size specification step can specify a size of a QR code by specifying this size in a numeric character by using the numeric character size input step. Therefore, it is possible to accurately specify a specific size desired by a user.

In the print data editing program of the disclosure, the size specification step can specify sizes of a plurality of QR codes and hence the sizes of a plurality of QR codes at a time, thus requiring less labor than the case of specifying sizes of QR codes one by one.

The print data editing program of the disclosure can handle divided QR codes into which one QR code is divided in such a manner that they can be concatenated when they are to be read. Therefore, if one QR code is divided, sizes of all of divided QR codes can be specified at a time.

Although the invention has been described with reference to exemplary embodiments, it is to be understood that the invention is not limited to the exemplary embodiments or structures. Though the various elements of the exemplary embodiments are shown in various combinations and configurations, which are exemplary, other combinations and configurations, including more, less or only a single element, are also within the spirit and scope of the disclosure.

What is claimed is:

1. A print data editing apparatus that edits print data, comprising:

a display that displays a two-dimensional code comprising a number of cells, wherein the code is a QR code which is represented by an approximately square shape in which a plurality of squared cells, each of which is a structure-wise basic unit, is arranged vertically and horizontally;

a scale-up/down device that scales up or down the QR code being displayed on the display without changing a size of the cells, wherein said apparatus provides for displaying a graphical handle on said display with said QR code, said handle capable of being engaged and dragged by a user through operation of a mouse;

a size specification device that, responsive to a user's up or down scaling of said two-dimensional code on said display, by dragging the handle of the QR code through operation of the mouse, specifies a size of the code being displayed on the display;

wherein the size specification device specifies a size of the QR code being displayed on the display by scaling up or down a size of the QR code by using the scale-up/down device;

a version determination device that determines a version that specifies an altered number of cells of unchanged size that constitute the scaled two-dimensional code, based on the size specified by the size specification device;

a code re-creation device that re-creates the code whose size has been specified by the size specification device into a code of the version determined by the version determination device, without changing the size of the cells; and a display control device that displays the QR code re-created by the code re-creation device on the display.

2. The print data editing apparatus according to claim 1, wherein the version determination device determines a version of a QR code having a largest size of those whose size is not larger than a size specified by the size specification device.

3. The print data editing apparatus according to claim 1, wherein the version determination device determines a version of a QR code having a smallest size of those whose size is not less than a size specified by the size specification device.

4. The print data editing apparatus according to claim 1, further comprising an output device that creates print data of the QR code re-created by the code re-creation device and outputs the print data to the printer.

5. The print data editing apparatus according to claim 1, further comprising numeric character size input device that inputs a size of the QR code in a numeric character, wherein the size specification device specifies a size of the QR code by specifying this size in a numeric character by using the numeric character size input device.

6. The print data editing apparatus according to claim 1, wherein the size specification device can specify sizes of a plurality of the QR codes.

7. The print data editing apparatus according to claim 6, wherein the plurality of QR codes is divided QR codes into which one QR code is divided in such a manner that they can be concatenated when they are to be read.

8. A print data editing apparatus that edits print data, comprising:
- a display that displays a two-dimensional code comprising a number of cells, wherein the code is a QR code which is represented by an approximately square shape in which a plurality of squared cells, each of which is a structure-wise basic unit, is arranged vertically and horizontally;
- a scale-up/down device that scales up or down the QR code being displayed on the display without changing a size of the cells, wherein said apparatus provides for displaying a graphical handle on said display with said QR code, said handle capable of being engaged and dragged by a user through operation of a mouse;
- a size specification device that, responsive to a user's up or down scaling of said two-dimensional code on said display, by dragging the handle of the QR code through operation of the mouse, specifies a size of the code being displayed on the display;
- wherein the size specification device specifies a size of the QR code being displayed on the display by scaling up or down a size of the QR code by using the scale-up/down device;
- a controller that determines a version that specifies an altered number of the cells of unchanged size that constitute the scaled two-dimensional code, based on the size specified by the size specification device; and
- the controller re-creates the code whose size has been specified by the size specification device into a code of the version determined by the version determination device, without changing the size of the cells; and
- the controller displays the re-created QR code on the display.

9. The print data editing apparatus according to claim 8, wherein the controller determines a version of a QR code having a largest size of those whose size is not larger than a size specified by the size specification device.

10. The print data editing apparatus according to claim 8, wherein the controller determines a version of a QR code having a smallest size of those whose size is not less than a size specified by the size specification device.

11. The print data editing apparatus according to claim 8, wherein the controller creates print data of the re-created QR code and outputs the print data to the printer.

12. The print data editing apparatus according to claim 8, further comprising a numeric character size input device that inputs a size of the QR code in a numeric character, wherein the size specification device specifies a size of the QR code by specifying this size in a numeric character by using the numeric character size input device.

13. The print data editing apparatus according to claim 8, wherein the size specification device can specify sizes of a plurality of the QR codes.

14. The print data editing apparatus according to claim 13, wherein the plurality of QR codes is divided QR codes into which one QR code is divided in such a manner that they can be concatenated when they are to be read.

15. A non-transitory computer readable storage medium storing a print data editing program for executing plural steps, said steps comprising:
- a display step that displays on a display a two-dimensional code comprising a number of cells, wherein the code is a QR code which is represented by an approximately square shape in which a plurality of squared cells, each of which is a structure-wise basic unit, is arranged vertically and horizontally;
- a scale-up/down step that scales up or down the QR code being displayed at the display step without changing a size of the cells, wherein said program provides for executing a graphical handle displaying step for displaying a graphical handle on said display with said QR code, said handle capable of being engaged and dragged by a user through operation of a mouse;
- a size specification step that, responsive to a user's up or down scaling of said two-dimensional code on said display, by dragging the handle of the QR code through operation of the mouse, specifies a size of the code being displayed at the display step;
- wherein the size specification step specifies a size of the QR code being displayed at the display step by scaling up or down the QR code by using the scale-up/down step;
- a version determination step that determines a version that specifies an altered number of the cells of unchanged size that constitute the scaled two-dimensional code, based on the size specified at the size specification step;
- a code re-creation step that re-creates the code whose size has been specified at the size specification step into a code of the version determined at the version determination step, without changing the size of the cells;
- and a display control step that displays a QR code re-created at the code re\-creation step on the display.

16. The computer readable storage medium according to claim 15, wherein the version determination step determines a version of a QR code having a largest size of those whose size is not larger than a size specified at the size specification step.

17. The computer readable storage medium according to claim 15, wherein the version determination step determines a version of a QR code having a smallest size of those whose size is not less than a size specified at the size specification step.

18. The computer readable storage medium according to claim 15, further comprising an output step that creates print data of the QR code re-created at the code re-creation step and outputs it to the printer.

19. The computer readable storage medium according to claim 15, further comprising a numeric character size input step that inputs a size of the QR code in a numeric character, wherein the size specification step specifies a size of the QR code by specifying this size in a numeric character by using the numeric character size input step.

20. The computer readable storage medium according to claim 15, wherein the size specification step can specify sizes of a plurality of the QR codes.

21. The computer readable storage medium according to claim 20, wherein the plurality of QR codes is divided QR codes into which one QR code is divided in such a manner that they can be concatenated when they are to be read.

* * * * *